(12) United States Patent
Abe et al.

(10) Patent No.: US 7,536,620 B2
(45) Date of Patent: May 19, 2009

(54) METHOD OF AND APPARATUS FOR VALIDATION SUPPORT, COMPUTER PRODUCT FOR VALIDATION SUPPORT

(75) Inventors: Kenji Abe, Kawasaki (JP); Yutaka Tamiya, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 161 days.

(21) Appl. No.: 10/680,105

(22) Filed: Oct. 8, 2003

(65) Prior Publication Data

US 2004/0073859 A1    Apr. 15, 2004

(30) Foreign Application Priority Data

Oct. 9, 2002   (JP)   ............................. 2002-295984
Jun. 30, 2003  (JP)   ............................. 2003-188940

(51) Int. Cl.
*G01R 31/28* (2006.01)
(52) U.S. Cl. ..................... 714/735; 714/741; 714/738
(58) Field of Classification Search ...................... None
See application file for complete search history.

(56) References Cited

U.S. PATENT DOCUMENTS

| | | | | |
|---|---|---|---|---|
| 5,542,043 | A * | 7/1996 | Cohen et al. | 714/32 |
| 5,592,493 | A * | 1/1997 | Crouch et al. | 714/729 |
| 5,751,737 | A * | 5/1998 | Lagrotta et al. | 714/727 |
| 5,870,590 | A * | 2/1999 | Kita et al. | 716/4 |
| 6,195,776 | B1 * | 2/2001 | Ruiz et al. | 714/738 |
| 6,385,750 | B1 * | 5/2002 | Kapur et al. | 714/738 |
| 6,470,468 | B1 * | 10/2002 | Fukui | 714/744 |
| 6,578,167 | B2 * | 6/2003 | Boorom et al. | 714/727 |
| 6,631,344 | B1 * | 10/2003 | Kapur et al. | 703/22 |
| 6,678,841 | B1 * | 1/2004 | Kurosawa et al. | 714/57 |
| 6,789,222 | B2 * | 9/2004 | Buckley, Jr. | 714/738 |
| 6,810,372 | B1 * | 10/2004 | Unnikrishnan et al. | 703/13 |
| 2002/0091980 | A1 * | 7/2002 | Buckley, Jr. | 714/738 |
| 2002/0138802 | A1 * | 9/2002 | Firth et al. | 714/733 |
| 2004/0025123 | A1 * | 2/2004 | Angilivelil | 716/4 |
| 2004/0068681 | A1 * | 4/2004 | Smith | 714/43 |
| 2004/0073859 | A1 * | 4/2004 | Abe et al. | 714/735 |

FOREIGN PATENT DOCUMENTS

| | | |
|---|---|---|
| JP | 2001-142918 | 5/2001 |
| WO | 00/72145 | 11/2000 |

OTHER PUBLICATIONS

IEEE 100 The Avthoritative Dictionary of IEE Standards Terms Seventh Edition, Copyright 2000, Published Dec. 2000, p. 725.*
Sheldon B. Akers, Binary Decision Diagram, IEEE, Jun. 1978, 509-516.*
Ryser, Johannes, et al., "A Scenario-Based Approach to Validating and Testing Software Systems Using Statecharts", 1999.
European Search Report for European Application No. 03 25 6356.1, R. Bauer, issued Mar. 8, 2006, 3 pp.
Notice of Rejection mailed Sep. 11, 2007 in Japanese application 2003-188940.
Notice of Rejection issued Sep. 9, 2008 in the corresponding Japanese Patent Application No. 2003-188940 (2 pages with 1 additional page of English translation).

* cited by examiner

*Primary Examiner*—Cynthia Britt
*Assistant Examiner*—Steven D Radosevich
(74) *Attorney, Agent, or Firm*—Staas & Halsey LLP

(57) ABSTRACT

An information input unit inputs functional configuration information representing a function of a device to be validated. A condition input unit inputs conditions concerning input/output sequence that is given to the device. A function generation unit generates a validation item function that fulfills all of the conditions based on the functional configuration information. An extraction unit extracts a combination of configuration elements that constitute the functional configuration information as a validation item based on the validation item function.

11 Claims, 24 Drawing Sheets

FIG.4

| NODE NUMBER | BOOLEAN VARIABLE |
|---|---|
| NODE 301 | inVideo |
| NODE 302 | inDVD |
| NODE 303 | inHDD |
| NODE 304 | encMPEG |
| NODE 305 | decMPEG |
| NODE 306 | outVideo |
| NODE 307 | outDVD |
| NODE 308 | outHDD |

FIG.5

| EDGE NUMBER | BOOLEAN VARIABLE |
|---|---|
| EDGE 311 | inVideo_outVideo |
| EDGE 312 | inVideo_encMPEG |
| EDGE 313 | inDVD_decMPEG |
| EDGE 314 | inHDD_decMPEG |
| EDGE 315 | decMPEG_outVideo |
| EDGE 316 | encMPEG_outDVD |
| EDGE 317 | encMPEG_outHDD |

FIG.10

| NODE NAME | BOOLEAN VARIABLE | 0_ NODE AT THE EDGE SIDE | 1_ NODE AT THE EDGE SIDE |
|---|---|---|---|
| node_1 | inVideo | node_2 | node_26 |
| node_2 | inDVD | node_3 | node_16 |
| node_3 | inHDD | Val_0 | node_4 |
| node_4 | decMPEG | Val_0 | node_5 |
| node_5 | encMPEG | node_6 | Val_0 |
| node_6 | outVideo | Val_0 | node_7 |
| node_7 | outDVD | node_8 | Val_0 |
| node_8 | outHDD | node_9 | Val_0 |
| node_9 | inVideo_outVideo | node_10 | Val_0 |
| node_10 | inVideo_encMPEG | node_11 | Val_0 |
| node_11 | inDVD_decMPEG | node_12 | Val_0 |
| node_12 | inHDD_decMPEG | Val_0 | node_13 |
| node_13 | decMPEG_outVideo | Val_0 | node_14 |
| node_14 | encMPEG_outDVD | node_15 | Val_0 |
| node_15 | encMPEG_outHDD | Val_1 | Val_0 |
| node_16 | inHDD | node_17 | Val_0 |
| node_17 | decMPEG | Val_0 | node_18 |
| node_18 | encMPEG | node_19 | Val_0 |
| node_19 | outVideo | Val_0 | node_20 |
| node_20 | outDVD | node_21 | Val_0 |
| node_21 | outHDD | node_22 | Val_0 |
| node_22 | inVideo_outVideo | node_23 | Val_0 |
| node_23 | inVideo_encMPEG | node_24 | Val_0 |
| node_24 | inDVD_decMPEG | Val_0 | node_25 |
| node_25 | inHDD_decMPEG | node_13 | Val_0 |
| node_26 | inDVD | node_27 | node_87 |
| node_27 | inHDD | node_28 | node_66 |
| node_28 | decMPEG | node_29 | Val_0 |
| node_29 | encMPEG | node_30 | node_38 |
| node_30 | outVideo | Val_0 | node_31 |
| node_31 | outDVD | node_32 | Val_0 |
| node_32 | outHDD | node_33 | Val_0 |
| node_33 | inVideo_outVideo | Val_0 | node_34 |
| node_34 | inVideo_encMPEG | node_35 | Val_0 |
| node_35 | inDVD_decMPEG | node_36 | Val_0 |

FIG.11

| NODE NAME | BOOLEAN VARIABLE | 0_NODE AT THE EDGE SIDEw | 1_NODE AT THE EDGE SIDE |
|---|---|---|---|
| node_36 | inHDD_decMPEG | node_37 | Val_0 |
| node_37 | decMPEG_outVideo | node_14 | Val_0 |
| node_38 | outVideo | node_39 | node_60 |
| node_39 | outDVD | node_40 | node_47 |
| node_40 | outHDD | Val_0 | node_41 |
| node_41 | inVideo_outVideo | node_42 | Val_0 |
| node_42 | inVideo_encMPEG | Val_0 | node_43 |
| node_43 | inDVD_decMPEG | node_44 | Val_0 |
| node_44 | inHDD_decMPEG | node_45 | Val_0 |
| node_45 | decMPEG_outVideo | node_46 | Val_0 |
| node_46 | encMPEG_outDVD | node_97 | Val_0 |
| node_47 | outHDD | node_48 | node_54 |
| node_48 | inVideo_outVideo | node_49 | Val_0 |
| node_49 | inVideo_encMPEG | Val_0 | node_50 |
| node_50 | inDVD_decMPEG | node_51 | Val_0 |
| node_51 | inHDD_decMPEG | node_52 | Val_0 |
| node_52 | decMPEG_outVideo | node_53 | Val_0 |
| node_53 | encMPEG_outDVD | Val_0 | node_15 |
| node_54 | inVideo_outVideo | node_55 | Val_0 |
| node_55 | inVideo_encMPEG | Val_0 | node_56 |
| node_56 | inDVD_decMPEG | node_57 | Val_0 |
| node_57 | inHDD_decMPEG | node_58 | Val_0 |
| node_58 | decMPEG_outVideo | node_59 | Val_0 |
| node_59 | encMPEG_outDVD | Val_0 | node_97 |
| node_60 | outDVD | node_61 | node_63 |
| node_61 | outHDD | Val_0 | node_62 |
| node_62 | inVideo_outVideo | Val_0 | node_42 |
| node_63 | outHDD | node_64 | node_65 |
| node_64 | inVideo_outVideo | Val_0 | node_49 |
| node_65 | inVideo_outVideo | Val_0 | node_55 |
| node_66 | decMPEG | Val_0 | node_67 |
| node_67 | encMPEG | Val_0 | node_68 |
| node_68 | outVideo | Val_0 | node_69 |
| node_69 | outDVD | node_70 | node_76 |
| node_70 | outHDD | Val_0 | node_71 |
| node_71 | inVideo_outVideo | node_72 | Val_0 |

FIG.12

| NODE NAME | BOOLEAN VARIABLE | 0_NODE AT THE EDGE SIDE | 1_NODE AT THE EDGE SIDE |
|---|---|---|---|
| node_72 | inVideo_encMPEG | Val_0 | node_73 |
| node_73 | inDVD_decMPEG | node_74 | Val_0 |
| node_74 | inHDD_decMPEG | Val_0 | node_75 |
| node_75 | decMPEG_outVideo | Val_0 | node_46 |
| node_76 | outHDD | node_77 | node_82 |
| node_77 | inVideo_outVideo | node_78 | Val_0 |
| node_78 | inVideo_encMPEG | Val_0 | node_79 |
| node_79 | inDVD_decMPEG | node_80 | Val_0 |
| node_80 | inHDD_decMPEG | Val_0 | node_81 |
| node_81 | decMPEG_outVideo | Val_0 | node_53 |
| node_82 | inVideo_outVideo | node_83 | Val_0 |
| node_83 | inVideo_encMPEG | Val_0 | node_84 |
| node_84 | inDVD_decMPEG | node_85 | Val_0 |
| node_85 | inHDD_decMPEG | Val_0 | node_86 |
| node_86 | decMPEG_outVideo | Val_0 | node_59 |
| node_87 | inHDD | node_88 | Val_0 |
| node_88 | decMPEG | Val_0 | node_89 |
| node_89 | encMPEG | Val_0 | node_90 |
| node_90 | outVideo | Val_0 | node_91 |
| node_91 | outDVD | node_92 | Val_0 |
| node_92 | outHDD | Val_0 | node_93 |
| node_93 | inVideo_outVideo | node_94 | Val_0 |
| node_94 | inVideo_encMPEG | Val_0 | node_95 |
| node_95 | inDVD_decMPEG | Val_0 | node_96 |
| node_96 | inHDD_decMPEG | node_75 | Val_0 |
| node_97 | endMPEG_outHDD | Val_0 | Val_1 |

FIG.24

| No. | INPUT UNIT | FUNCTIONAL DEVICE 1 | FUNCTIONAL DEVICE 2 | FUNCTIONAL DEVICE 3 | FUNCTIONAL DEVICE 4 | OUTPUT UNIT | VALIDATION COST |
|---|---|---|---|---|---|---|---|
| 1 | aaaaa | (A) | (I) | (N) | (E) | ddddd | 7 |
|   | bbbbb | (B) | (J) |  | (F) | eeeee |  |
| 2 | aaaaa | (A) | (I) | (K) | (G) | fffff | 18 |
|   | bbbbb | (B) | (J) | (O) | (H) | ggggg |  |
|   |   |   | (K) |  | (G) | fffff |  |
| 3 | ccccc | (C) |  |  | (F) | eeeee | 6 |
|   |   |   | (L) | (K) | (G) | fffff |  |
| 4 | ccccc | (D) | (M) | (O) | (F) | eeeee | 18 |
|   |   |   |  |  | (H) | ggggg |  |
| 5 | ccccc | (D) |  |  | (E) | ddddd | 4 |

FIG.25

| No. | INPUT UNIT | FUNCTIONAL DEVICE 1 | FUNCTIONAL DEVICE 2 | FUNCTIONAL DEVICE 3 | FUNCTIONAL DEVICE 4 | OUTPUT UNIT | VALIDATION COST |
|---|---|---|---|---|---|---|---|
| 1 | AudioIn | INPUT ANALOG AUDIO | CONVERT ANALOG AUDIO INTO DIGITAL AUDIO | CONVERT DIGITAL AUDIO AND DIGITAL VIDEO INTO MPEG STREAM | OUTPUT MPEG STREAM | HDD Out | 7 |
|   | VideoIn | INPUT ANALOG VIDEO | CONVERT ANALOG VIDEO INTO DIGITAL VIDEO |   |   |   |   |
| 2 | AudioIn | INPUT ANALOG AUDIO | CONVERT ANALOG AUDIO INTO DIGITAL AUDIO |   | OUTPUT DIGITAL AUDIO | SPDIF Out | 18 |
|   |   |   |   |   | OUTPUT ANALOG AUDIO | Audio Out |   |
|   | VideoIn | INPUT ANALOG VIDEO | CONVERT ANALOG VIDEO INTO DIGITAL VIDEO | CONVERT DIGITAL VIDEO INTO ANALOG VIDEO | OUTPUT ANALOG VIDEO | Video Out |   |
| 3 | AudioIn | INPUT ANALOG AUDIO | CONVERT ANALOG AUDIO INTO DIGITAL AUDIO | CONVERT DIGITAL AUDIO INTO ANALOG AUDIO | OUTPUT ANALOG AUDIO | Audio Out | 6 |
|   | HDDIn | INPUT DIGITAL AUDIO |   |   | OUTPUT DIGITAL AUDIO | SPDIF Out |   |
| 4 | HDDIn | INPUT MPEG STREAM | CONVERT MPEG STREAM INTO DIGITAL AUDIO | CONVERT DIGITAL AUDIO INTO ANALOG AUDIO | OUTPUT ANALOG AUDIO | Audio Out | 18 |
|   |   |   |   |   | OUTPUT DIGITAL AUDIO | SPDIF Out |   |
|   | HDDIn | INPUT MPEG STREAM | CONVERT MPEG STREAM INTO DIGITAL VIDEO | CONVERT DIGITAL VIDEO INTO ANALOG VIDEO | OUTPUT ANALOG VIDEO | Video Out |   |
| 5 | HDDIn | INPUT MPEG STREAM |   |   | OUTPUT MPEG STREAM | HDD Out | 4 |

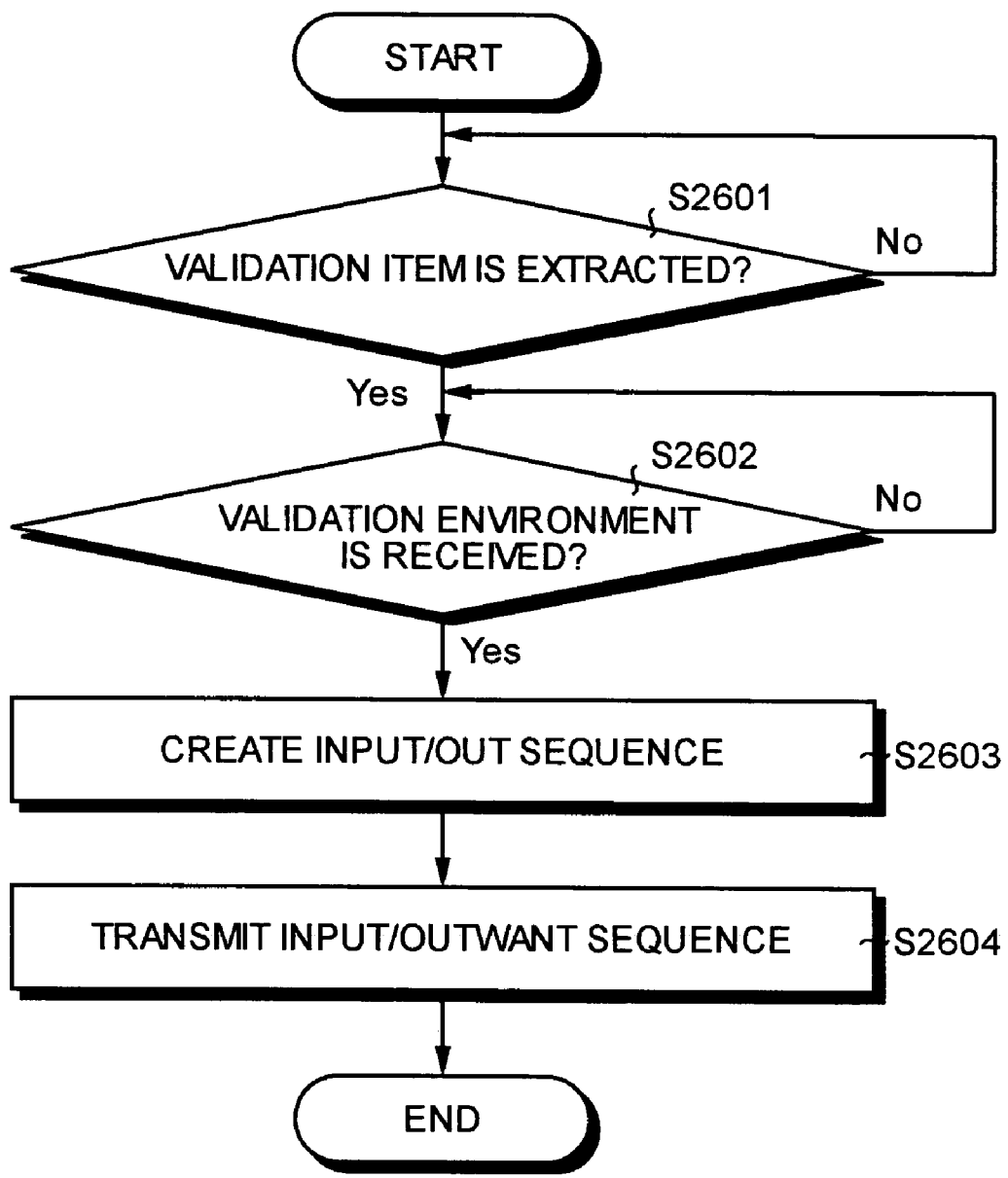

[reset = 1] [reset = 0]-

| | | | | |
|---|---|---|---|---|
| IF | (A) THEN | data_A | = | D1 |
| IF | (B) THEN | data_B | = | D2 |
| IF | (C) THEN | data_C | = | D3 |
| IF | (D) THEN | data_D | = | D4 |
| IF | (E) THEN | mode_E | = | 1 |
| IF | (F) THEN | mode_F | = | 1 |
| IF | (G) THEN | mode_G | = | 1 |
| IF | (H) THEN | mode_H | = | 1 |

0   reset = 1
1   reset = 0
     data_A = D1
     data_B = D2
     mode_E = 1

METHOD OF AND APPARATUS FOR VALIDATION SUPPORT, COMPUTER PRODUCT FOR VALIDATION SUPPORT

CROSS-REFERENCE TO RELATED APPLICATIONS

This application is based upon and claims the benefit of priories from the Japanese Patent Application No. 2002-295984, filed on Oct. 9, 2002, and the Japanese Patent Application No. 2003-188940, filed on Jun. 30, 2003, the entire contents of which are incorporated herein by reference.

BACKGROUND OF THE INVENTION

1) Field of the Invention

The present invention relates to a technology for generating validation items to create an input/output sequence called a test pattern.

2) Description of the Related Art

Conventionally, a large scale integrated circuit (LSI) design necessitates a validation process to validate a normal operation of the LSI, as well as an improvement in work efficiency by shortening a time for the design. Particularly, the validation process is an indispensable step to maintain high quality of the LSI that requires large scale, advanced function, high speed, and low power consumption.

In the validation process, a series of input/output sequences called a test pattern is created. An input signal is given to the LSI based on the input/output sequence, and it is confirmed whether an output signal from the LSI coincides with an expectation value. With this arrangement, it is possible to validate whether an apparatus is operating as expected. However, there are an enormous number of functional devices within the LSI. With this situation, manual listing of a data flow (i.e., a sequence) between all the functional devices is difficult, and the input/output sequence (i.e., the test pattern) generation is complicated.

Conventionally, there is a method of extracting the input/output sequence from a functional block diagram created by using a predetermined description language. According to the method, the functional block diagram expresses the apparatus to be validated as a functional device and a data flow between the functional devices. A graph is created by replacing the functional devices and the data flow with nodes edges, respectively. Then, one sequence is specified through one path on the graph. As a result, an input/output sequence that is given to the apparatus to be validated can be listed. The conventional method is described in, for example, J. Ryser, M. Glinz, "A Scenario-Based Approach to Validating and Testing Software Systems Using Statecharts", $12^{th}$ Intl. Conf. on Software Engineering and their Applications, December 1999.

However, since the functional devices in the LSI operate in parallel based on a parallel execution of the hardware, the conventional method, which can only take a path on the graph into consideration one by one, cannot handle a simultaneous execution of a plurality of sequences. Further, the conventional method does not take into account a resource constraint specific to a hardware such as sharing and exclusive utilization of functional devices in the apparatus to be validated like the LSI.

Therefore, the input/output sequence listed by the conventional method actually includes a non-executable input/output sequence. An attempt to carry out the validation by using the non-executable input/output sequence becomes a failure. Consequently, work time and labor become wasteful, and a design time becomes longer.

SUMMARY OF THE INVENTION

It is an object of the present invention to solve at least the problems in the conventional technology.

The method of validation support according to one aspect of the present invention includes inputting functional configuration information that represents a function of an apparatus to be validated, inputting a condition for an input/output sequence that is assigned to the apparatus, generating a validation item function that satisfies all conditions for the input/output sequence, based on the functional configuration information, and extracting a combination of configuration elements that constitute the functional configuration information as a validation item, based on the validation item function.

The computer program according to another aspect of the present invention realizes the methods according to the present invention on a computer.

The apparatus for validation support according to still another aspect of the present invention includes an information input unit that inputs functional configuration information that represents a function of an apparatus to be validated, a condition input unit that inputs a condition for an input/output sequence that is given to the apparatus, a generation unit that generates a validation item function that satisfies all conditions for the input/output sequence, based on the functional configuration information, and an extraction unit that extracts a combination of configuration elements that constitute the functional configuration information as a validation item, based on the validation item function.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is a table of a relationship between node numbers and Boolean variables in the apparatus to be validated according to the first embodiment;

FIG. 5 is a table of a relationship between edge numbers and Boolean variables in the apparatus to be validated according to the first embodiment;

FIG. 10 is an example of a table (part one) listing validation item functions generated by the validation support apparatus according to the first embodiment in the BDD format;

FIG. 11 is an example of a table (part two) listing validation item functions generated by the validation support apparatus according to the first embodiment in the BDD format;

FIG. 12 is an example of a table (part three) listing validation item functions generated by the validation support apparatus according to the first embodiment in the BDD format;

FIG. 24 is a table of validation items and validation costs extracted by the validation support apparatus according to the second embodiment;

FIG. 25 is a table of validation items and validation costs that are converted into original description information from code information included in the validation items and the validation cost shown in FIG. 24;

FIG. 26 is a flowchart of an example of an input/output sequence creation process of the validation support apparatus according to the second embodiment;

DETAILED DESCRIPTION

Exemplary embodiments of a method and an apparatus for validation support, a computer product for the validation support according to the present invention are explained in detail with reference to the accompanying drawings. The validation support apparatus extracts validation items that become a source for creating an input/output sequence called a test pattern, in order to validate whether an apparatus to be validated operates normally. The validation support apparatus gives the input/output sequence obtained from the validation items to the apparatus to be validated to validate the apparatus.

Figure 1:
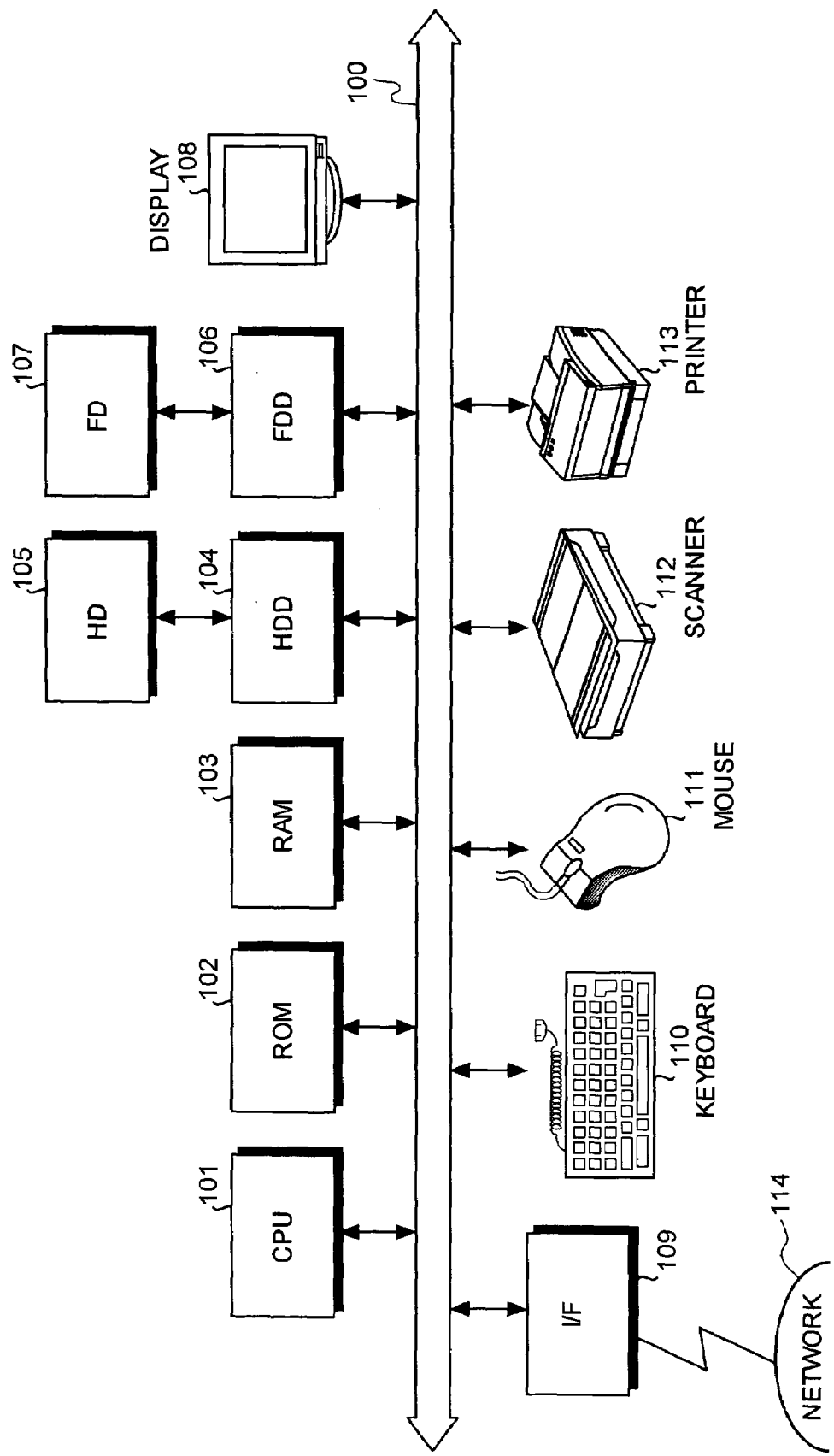
FIG. 1 is a block diagram of a validation support apparatus according to a first embodiment and a second embodiment of the present invention, with an information terminal apparatus according to the second embodiment.

FIG. 1 is a block diagram of a validation support apparatus according to a first embodiment and a second embodiment of the present invention, with an information terminal apparatus according to the second embodiment. The validation support apparatus comprises a central processing unit (CPU) 101, a read-only memory (ROM) 102, a random access memory (RAM) 103, a hard disk drive (HDD) 104, a hard disk (HD) 105, a flexible drive disk (FDD) 106, a flexible disk (FD) 107, a display 108, an interface (I/F) 109, a keyboard 110, a mouse 111, a scanner 112, and a printer 113. These constituent units are connected to each other via a bus 100.

The CPU 101 controls the total validation support apparatus. The ROM 102 stores a program such as a boot program. The RAM 103 is used as a work area of the CPU 101. The HDD 104 controls read and write of data from and to the HDD 105 according to the control from the CPU 101. The HD 105 stores the data written based on the control from the HDD 104.

The FDD 106 controls read and write of data from and to the FDD 107 according to the control from the CPU 101. The FDD 107 stores the data written based on the control from the FDD 106, and makes the validation support apparatus read the data stored in the FD 107.

As detachable recording mediums, a CD-ROM (CD-R, CD-RW), a magnet optical (MO), a digital versatile disk (DVD), and a memory card may be used in addition to the FD 107. The display 108 displays a cursor, an icon, a tool box, and data such as a document, an image, and functional information. A cathode ray tube (CRT), a thin film transistor (TFT) liquid crystal display, and a plasma display can be employed for the display 108.

The I/F 109 is connected to a network such as the Internet via a communication line, and is further connected to other apparatuses via the network. The I/F 109 interfaces between the network 114 and the inside of the validation support apparatus, thereby to control the input and output of data from and to external apparatuses. A modem and a local area network (LAN) adapter can be used for the I/F 109.

The keyboard 110 has keys to input characters, numerals, and various kinds of instructions to input data. The keyboard 110 may be a touch-panel input pad or ten keys. The mouse 111 is used to move the cursor, select a range, move windows, and change sizes of the windows. The mouse 111 may be a track ball or a joystick so far as this has functions of a pointing device.

The scanner 112 optically reads an image to fetch image data into the validation support apparatus. The scanner 112 may have the OCR function. The printer 113 prints image data and document data. A laser printer or an inkjet printer may be used for the printer 113.

Figure 2:
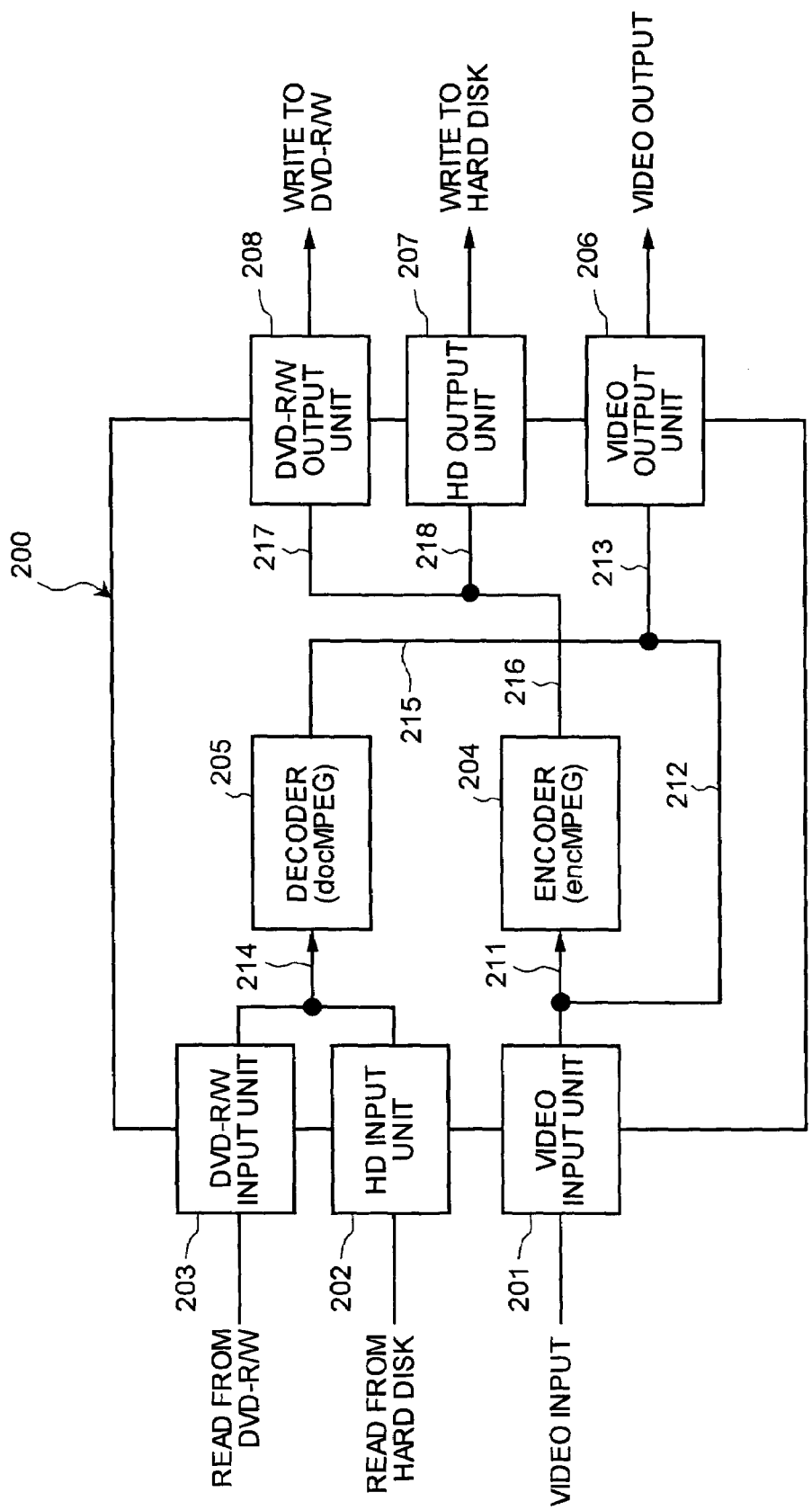
FIG. 2 is a block diagram of functional configuration information of an apparatus to be validated according to the first embodiment.

Functional configuration information of the apparatus to be validated will be explained next. FIG. 2 is a block diagram of functional configuration information of an apparatus to be validated according to the first embodiment. The functional configuration information can be created by a predetermined description language such as a unified modeling language (UML). As one example of the functional configuration information, a use case diagram or a sequence diagram is available. As one example, the case of using a DVD/HDD video recorder as an apparatus to be validated will be explained.

As shown in FIG. 2, a DVD/HDD video recorder 200 as the apparatus to be validated has functional devices and configuration elements. The functional devices include a video input unit 201, an HD input unit 202, a DVD-R/W input unit 203, an encoder 204, a decoder 205, a video output unit 206, an HD output unit 207, and a DVD-R/W output unit 208. The configuration elements include signal lines 211 to 218 that connect between the functional devices.

The video input unit 201 inputs video data. The HD input unit 202 inputs moving picture expert group (MPEG) data read from the HD. The DVD-R/W input unit 203 inputs the MPEG data read from a DVD-R/W disk The encoder 204 encodes the video data input from the video input unit 201 into MPEG data.

The decoder 205 decodes the MPEG data input from the HD input unit 202 or the DVD-R/W input unit 203 into video data. The video output unit 206 outputs the video data input from the video input unit 201 or the video data decoded by the decoder 205. The HD output unit 207 and the DVD-R/W output unit 208 output the MPEG data encoded by the encoder 204, and write the MPEG data into the HD and the DVD-R/W disk respectively.

Figure 3:
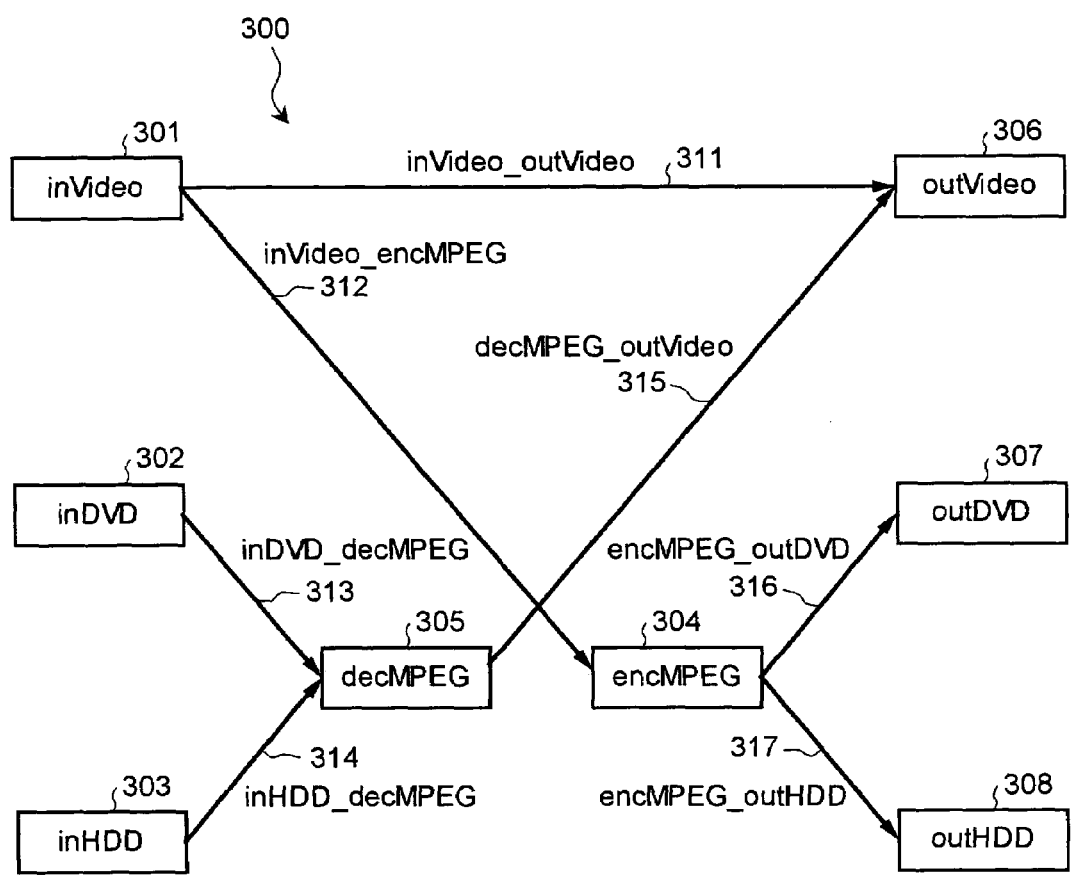
FIG. 3 is a graph converted from the functional configuration information of the apparatus to be validated according to the first embodiment.

A graph illustrating the function block diagram shown in FIG. 2 will be explained next FIG. 3 is a graph converted from the functional configuration information of the apparatus shown in FIG. 2. This graph 300 illustrates a conversion of the functional devices (i.e., the video input unit 201, the HD input unit 202, the DVD-R/W input unit 203, the encoder 204, the decoder 205, the video output unit 206, the HD output unit 207, and the DVD-R/W output unit 208) into nodes 301 to 308, and a conversion of the signal lines 211 to 218 that connect between the functional devices into edges 311 to 317 respectively. The following Boolean variables are given to the nodes 301 to 308 and the edges 311 to 317 respectively.

In the example shown in FIG. 3, the following eight Boolean variables are defined for the nodes 301 to 308. As shown in FIG. 4, the Boolean variables are related to the nodes 301 to 308 respectively. As shown in FIG. 5, the Boolean variables are related to the edges 311 to 317 obtained by the conversion respectively.

Figure 6:
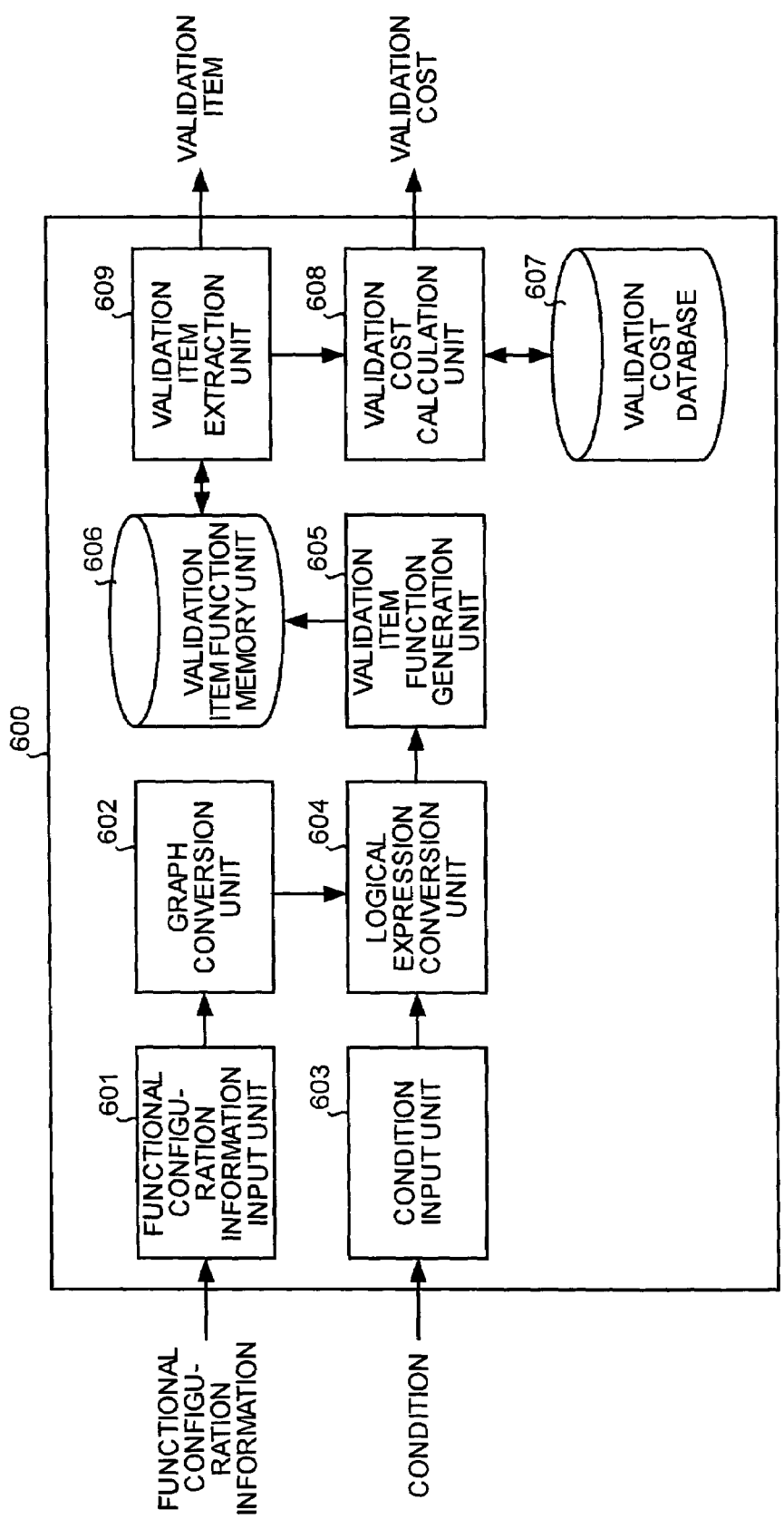
FIG. 6 is a block diagram of functional configuration of the validation support apparatus according to the first embodiment.

FIG. 6 is a block diagram of functional configuration of the validation support apparatus according to the first embodiment. A validation support apparatus 600 comprises a functional configuration information input unit 601, a graph conversion unit 602, a condition input unit 603, a logical expression conversion unit 604, a validation item function generation unit 605, a validation item function memory unit 606, a validation cost database 607, a validation cost calculation unit 608, and a validation item extraction unit 609.

The functional configuration information input unit 601 inputs functional configuration information that expresses a functional configuration of an apparatus to be validated. The functional configuration information is the functional block diagram 200 that illustrates the functional configuration of the validation support apparatus as shown in FIG. 2. The functional configuration information includes the configuration elements consisting of the functional devices 201 to 208 and the signal lines 211 to 218 between the functional devices (i.e., a data flow between the functional devices).

The graph conversion unit 602 converts the functional block diagram 200 of the apparatus to be validated input to the functional configuration information input unit 601 (see FIG. 2), into the graph 300 (see FIG. 3) that includes the nodes 301 to 308 and the edges 311 to 317. In other words, the graph conversion unit 602 converts the functional devices 201 to 208 in the functional block diagram 200 into the nodes 301 to 308, and converts the signal lines 211 to 218 that connect between the functional devices (i.e., the data flow between the functional devices) into the edges 311 to 317.

The condition input unit 603 inputs conditions regarding the input/output sequence that is given to the apparatus to be validated. For the conditions regarding the input/output sequence, there are a condition for a starting point and an end point of the input/output sequence (condition 1), a condition for connection of the edges (condition 2), a condition for a fan-out of the functional devices (condition 3), a condition for a fan-in of the functional devices (condition 4), a resource constraint condition for the functional devices (condition 5), and a condition that limits a configuration element to be validated among the configuration elements that constitute the functional block diagram (condition 6).

The logical expression conversion unit 604 converts the graph 300 consisting of the nodes 301 to 308 and the edges 311 to 317 obtained by the graph conversion unit 602, and the input/output sequence input by the condition input unit 603, into logical expressions. This logical expression is created according to a Boolean algebra. Details of the conversion into the logical expression will be explained later.

Figure 7:
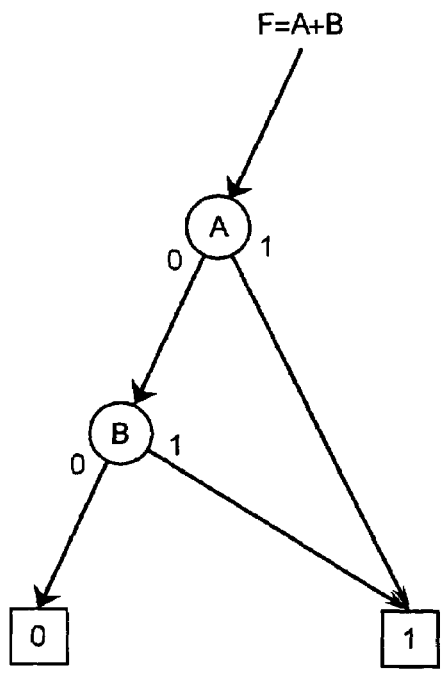
FIG. 7 is an example of a binary decision diagram (BDD) that is applied to the validation support apparatus according to the first embodiment.

The validation item function generation unit 605 generates validation item functions using a binary decision diagram (BDD), based on the generated logical expression. The validation item function memory unit 606 stores the generated validation item functions. The BDD is a data configuration that expresses the logic function in compact by using the graph as shown in FIG. 7. The BDD is explained in detail in, for example, R. E. Bryant, "Graph-based Algorithms for Boolean Function Manipulation", IEEE Trans. on Computers, C-35, August 1986.

Figure 8:
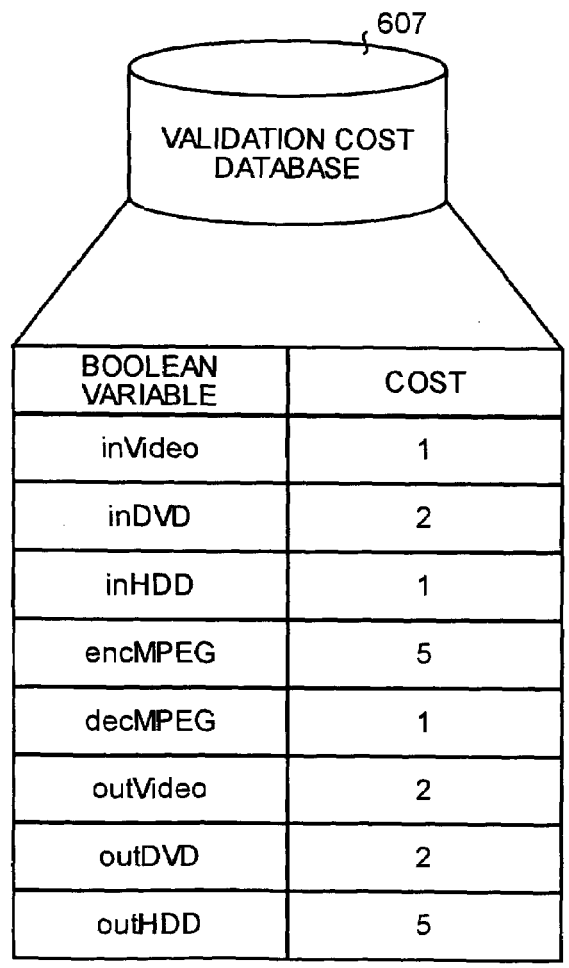
FIG. 8 is a configuration of data stored in a validation cost database of the validation support apparatus according to the first embodiment.

As shown in FIG. 8, the validation cost database 607 stores the Boolean variables shown in FIG. 4 by relating them to costs that become weights. Significance of the validation of the functional devices 201 to 208 (i.e., node 301 to 308) corresponding to the Boolean variables can be expressed by using these costs. A functional device corresponding to a Boolean variable having "1" as its cost can be defined as an existing design. A functional device corresponding to a Boolean variable having "2" as its cost can be defined as a diversion design. A functional device corresponding to a Boolean variable having "5" as its cost can be defined as a new design. In other words, when the cost is higher, the significance of the validation is higher, and when the cost is lower, the significance of the validation is lower.

The validation cost calculation unit 608 calculates validation costs of the validation items extracted by the validation item extraction unit 609. For example, the costs that become the weights are added beforehand to the nodes 301 to 308 obtained by the graph conversion unit 602, thereby to add the costs of the nodes included in the extracted validation items. With this arrangement, the validation costs are calculated. The calculated validation costs are output to the validation item extraction unit 609.

The validation item extraction unit 609 extracts a combination of the configuration elements that constitute the functional configuration information as validation items from the validation items stored in the validation item function memory unit 606. Specifically, the validation item extraction unit 609 extracts the validation items by obtaining sets of Boolean variables that make the validation item function as "1". These validation items can be extracted by using the BDD.

The validation item extraction unit 609 extracts n validation items set in advance. The validation item extraction unit 609 extracts the n validation items based on the costs of the validation items calculated by the validation cost calculation unit 608. For example, the validation items may be laid out in the order of the validation costs thereby to extract the validation items up to the n-th validation item. Alternatively, the n validation items may be generated in the order of the calculated costs by using a method introduced in "Algorithm Dictionary" by Koichi Shimada et al., the paragraph of "the shortest route (graph)", pp. 279 to 280, Kyoritsu Shuppan Co., Ltd., 1994.

The functional configuration information input unit 601, the graph conversion unit 602, the condition input unit 603, the logical expression conversion unit 604, the validation item function generation unit 605, the validation cost calculation unit 608, and the validation item extraction unit 609 achieve their functions as follows. In other words, the CPU 101 executes programs stored in the ROM 102, the RAM 103, the HD 105, and the FD 107, or via the I/F 109. The validation item function memory unit 606 and the validation cost database 607 achieve their functions using the ROM 102, the RAM 103, the HD 105, and the FD 107 shown in FIG. 1.

The conversion from the condition regarding the input/output sequence into the logical expression will be explained next. As explained above, the conditions regarding the input/output sequence include the condition for a starting point and an end point of the input/output sequence (condition 1), the condition for connection of the edges (condition 2), the condition for a fan-out of the functional devices (condition 3), the condition for a fan-in of the functional devices (condition 4), the resource constraint condition for the functional devices (condition 5), and the condition that limits a configuration element to be validated among the configuration elements 201 to 208, and 211 to 218 that constitute the functional block diagram 200 (condition 6).

Negation, logical sum, logical product, unanimity, and equivalence in the Boolean algebra are expressed by "!", "+", "*", "→", and "≡" respectively. "A→B" has the same meaning as "!A+B", and "A≡B" has the same meaning as "(A→B)*(B→A)".

A node of a start of the input/output sequence is set as a "starting point". A node of an end of the input/output sequence is set as an "end point". In order to work out the input/output sequence, the logical sum of the Boolean variable of the node of the starting point needs to be "1". Similarly, the logical sum of the Boolean variable of the node of the end point also needs to be "1". In the example shown in FIG. 2 and FIG. 3, nodes of the starting points are the nodes 301 to 303. Nodes of the end points are the nodes 306 to 308. Therefore, the condition 1 can be converted into the following logical expressions by using the Boolean variables.

$$\text{inVideo} + \text{inDVD} + \text{inHDD} \quad (1)$$

$$\text{outVideo} + \text{outDVD} + \text{outHDD} \quad (2)$$

When data flows on the edges 311 to 317, the functional devices corresponding to the nodes at both ends of the edges need to be operating. The edge 311 (Boolean variable: inVideo_outVideo) shown in FIG. 3 can be expressed by the following expression.

$$\text{inVideo\_outVideo} \rightarrow \text{inVideo} * \text{outVideo} \quad (3)$$

The other edges 312 to 317 can also be expressed by the following logical expressions.

$$\text{inVideo\_encMPEG} \rightarrow \text{inVideo} * \text{encMPEG} \quad (4)$$

$$\text{inDVD\_decMPEG} \rightarrow \text{inDVD} * \text{decMPEG} \quad (5)$$

$$\text{inHDD\_decMPEG} \rightarrow \text{inHDD} * \text{decMPEG} \quad (6)$$

$$\text{decMPEG\_outVideo} \rightarrow \text{decMPEG} * \text{outVideo} \quad (7)$$

$$\text{encMPEG\_outDVD} \rightarrow \text{encMPEG} * \text{outDVD} \quad (8)$$

$$\text{encMPEG\_outHDD} \rightarrow \text{encMPEG} * \text{outHDD} \quad (9)$$

When a functional device corresponding to a certain node operates, data is transmitted to a functional device corresponding to the next node via any one of the fan-out edges. On the other hand, when any one of the fan-out edges of a functional device corresponding to a certain node is transmitting data, this functional device needs to be operating. This condition is expressed by the following logical expression.

For example, the node 301 (Boolean variable: inVideo) shown in FIG. 3 has the edge 311 (Boolean variable: inVideo_outVideo) and the edge 312 (Boolean variable: inVideo_encMPEG) as the fan-out edges. Therefore, this condition can be expressed by the following logical expression.

$$\text{inVideo} \equiv \text{inVideo\_outVideo} + \text{inVideo\_encMPEG} \quad (10)$$

Similarly fan-out edges of the other functional devices can also be expressed by the following expressions.

$$\text{inDVD} \equiv \text{inDVD\_decMPEG} \quad (11)$$

$$\text{inHDD} \equiv \text{inHDD\_decMPEG} \quad (12)$$

$$\text{decMPEG} \equiv \text{decMPEG\_outVideo} \quad (13)$$

$$\text{encMPEG} \equiv \text{encMPEG\_outDVD} + \text{encMPEG\_outHDD} \quad (14)$$

The condition 4 is similar to the condition 3. When a functional device corresponding to a certain node operates, data is transmitted from a pre-stage functional device via any one of the fan-in edges. On the other hand, when any one of the fan-in edges of a functional device corresponding to a certain node is transmitting data, this functional device needs to be operating. This condition is expressed by the following logical expression.

For example, the node 305 (Boolean variable: decMPEG) shown in FIG. 3 has the edge 313 (Boolean variable: inDVD_decMPEG) and the edge 314 (Boolean variable: inHDD_decMPEG) as the fan-in edges. Therefore, this condition can be expressed by the following logical expression.

$$\text{decMPEG} \equiv \text{inDVD\_decMPEG} + \text{inHDD\_decMPEG} \quad (15)$$

Similarly, fan-in edges of the other functional devices can also be expressed by the following expressions.

$$\text{encMPEG} \equiv \text{inVideo\_encMPEG} \quad (16)$$

$$\text{outVideo} \equiv \text{inVideo\_outVideo} + \text{decMPEG\_outVideo} \quad (17)$$

$$\text{outDVD} \equiv \text{encMPEG\_outDVD} \quad (18)$$

$$\text{outHDD} \equiv \text{encMPEG\_outHDD} \quad (19)$$

An attempt to simultaneously execute a plurality of input/output sequences might fail because of a constraint in the resource of a functional device corresponding to a certain node. For example, even when a functional device corresponding to a certain node has a plurality of fan-in edges, all the input cannot be executed simultaneously because of a resource constraint inside the functional device.

Conditions attributable to the resource constraints of the functional device on the hardware are expressed as logical expressions. For example, when only one input data can be accepted in the node 305 (Boolean variable: decMPEG) and the node 306 (Boolean variable: outVideo) shown in FIG. 3, the condition can be expressed by the following logical expressions.

$$!(inDVD\_decMPEG * inHDD\_decMPEG) \quad (20)$$

$$!(inVideo\_outVideo * decMPEG\_outVideo) \quad (21)$$

When there is the above resource constraint, the expression (21) indicates that either the edge 313 (Boolean variable: inDVD_decMPEG) or the edge 314 (Boolean variable: inHDD_decMPEG) must be "0". A constraint that a reading and a writing of data cannot be executed simultaneously because of a slow operating speed of the DVD-R/W disk can be expressed by the following logical expression.

$$!(inDVD * outDVD) \quad (22)$$

The conversion from the condition 6 into the logical expression is to narrow down configuration elements to be validated according to the needs. Specifically, when there is part already validated (for example, a functional device of an existing design) which is to be excluded from the validation from among the configuration elements to be validated, or when only a specific configuration element needs to be validated, a logical expression to narrow down validated items can be added.

For example, in FIG. 3, when a designer decides that only an input/output sequence that requires the use of the encoder 204 is necessary, a constraint expressed by the following logical expression may be added.

$$encMPEG=1 \quad (23)$$

Figure 9:
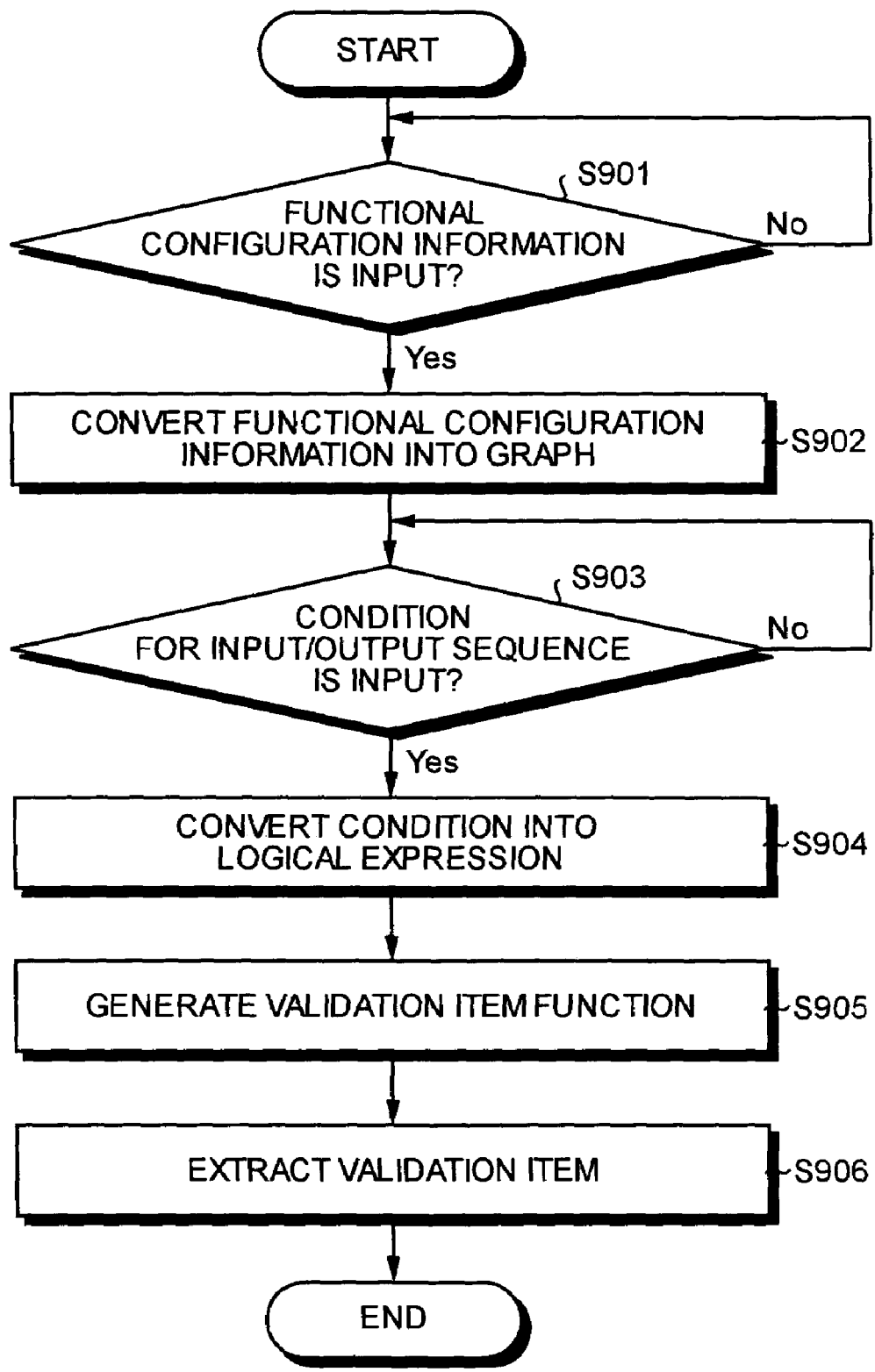
FIG. 9 is a flowchart of an example of a validation item extraction process of the validation support apparatus according to the first embodiment.

FIG. 9 is a flowchart of an example of a validation item extraction process of the validation support apparatus according to the first embodiment. First, the validation support apparatus decides whether the functional block diagram 200 as the functional configuration information shown in FIG. 2 is input (step S901). When the functional block diagram 200 is input (Yes at step S901), the validation support apparatus converts the functional block diagram 200 into the graph 300 shown in FIG. 3 (step S902).

The validation support apparatus decides whether the conditions regarding the input/output sequence are input (step S903). When the conditions regarding the input/output sequence are input (Yes at step S903), the validation support apparatus converts the conditions 1 to 6 into the logical expressions (1) to (23) using the Boolean algebra (step S904). The validation support apparatus generates the validation item functions from the logical expressions (1) to (23) obtained by the conversion (step S905).

The generation of the validation item functions will be explained in detail. In the example shown in FIG. 3, all the logical expressions (1) to (22) need to be "1". Therefore, a logical sum of all the logical expressions (1) to (22) becomes the validation item function. When the apparatus to be validated is a large-scale LSI, for example, this validation item function has a possibility of being expressed by a very complex logical expression.

In this case, it is preferable that the validation item function is expressed using the BDD shown in FIG. 7. FIG. 10 to FIG. 12 illustrates an example of these validation item functions. The validation item functions are illustrated in the format of a table in FIG. 10 to FIG. 12 for the sake of convenience, because a large graph becomes necessary to express these validation item functions in the graph of the BDD shown in FIG. 7.

In FIG. 10 to FIG. 12, "0_node at the edge side" indicates a node connected to the edge to be followed when the Boolean variable in the table shown in FIG. 7 is "0". "1_node at the edge side" indicates a node connected to the edge to be followed when the Boolean variable is "1". "val_0" and "val_1" represent nodes of constants 0 and 1 respectively.

The validation support apparatus extracts validation items from the generated validation item functions (step S906). The extraction of the validation items is to list the sets of Boolean variables that make the validation item function as "1". In other words, the validation support apparatus extracts all combinations of variables that fulfill the condition by changing the variables of the validation item functions to "0" or "1".

In other words, thirteen validation items of (a) to (m) listed below can be extracted by following the path to the "1_node".
(a) "inVideo, inDVD, decMPEG, encMPEG, outVideo, outHDD, inVideo_encMPEG, inDVD_decMPEG, decMPEG_outVideo, encMPEG_outHDD"
(b) "inVideo, inHDD, decMPEG, encMPEG, outVideo, outDVD, outHDD, inVideo_encMPEG, inHDD_decMPEG, decMPEG_outVideo, encMPEG_outDVD, encMPEG_outHDD"
(c) "inVideo, inHDD, decMPEG, encMPEG, outVideo, outDVD, inVideo_encMPEG, inHDD_decMPEG, decMPEG_outVideo, encMPEG_outDVD"
(d) "inVideo, inHDD, decMPEG, encMPEG, outVideo, outHDD, inVideo_encMPEG, inHDD_decMPEG, decMPEG_outVideo, encMPEG_outHDD"
(e) "inVideo, encMPEG, outVideo, outDVD, outHDD, inVideo_outVideo, inVideo_encMPEG, encMPEG_outDVD, encMPEG_outHDD"
(f) "inVideo, encMPEG, outVideo, outDVD, inVideo_outVideo, inVideo_encMPEG, encMPEG_outDVD"
(g) "inVideo, encMPEG, outVideo, outHDD, inVideo_outVideo, inVideo_encMPEG, encMPEG_outHDD"
(h) "inVideo, encMPEG, outDVD, outHDD, inVideo_encMPEG, encMPEG_outDVD, encMPEG_outHDD"
(i) "inVideo, encMPEG, outDVD, inVideo_encMPEG, encMPEG_outDVD"
(j) "inVideo, encMPEG, outHDD, inVideo_encMPEG, encMPEG_outHDD"
(k) "inVideo, outVideo, inVideo_outVideo"
(l) "inDVD, decMPEG, outVideo, inDVD_decMPEG, decMPEG_outVideo"
(m) "inHDD, decMPEG, outVideo, inHDD_decMPEG, decMPEG_outVideo"

When the validation item (a) is looked at among the validation items of (a) to (m), the following two paths in the graph 300 shown in FIG. 3 can be obtained:
Path 1: node 301→edge 312→node 304→edge 317→node 308, and
Path 2: node 302→edge 313→node 305→edge 315→node 306.

The path 1 is expressed by using the Boolean variables as follows: "inVideo"→"inVideo_encMPEG"→"encMPEG"→"encMPEG_outHDD"→"outHDD". The path 2 is expressed by using the Boolean variables as follows: "inDVD"→"inDVD_decMPEG"→"decMPEG"→"decMPEG_outVideo"→"outVideo".

A path is extracted from the validation items as described above, and an executable input/output sequence is obtained from the extracted path. Specifically, a validation environment is created as a control command or the like that prescribes a data flow along the extracted path, thereby to make it possible to generate an executable input/output sequence. The input/output sequence that becomes the validation pattern flows in this validation environment to validate the apparatus to be validated such as the LSI.

As explained above, according to the first embodiment of the present invention, validation items that become a due to the obtaining of the executable input/output sequence can be extracted from a combination of the functional devices 201 to 208. As a result, designer's validation efficiency can be improved.

When the validation item functions are complex, a total number of the validation items becomes too large, which is not realistic to list all the validation items. As the validation item functions are expressed in the BDD, the total number of the validation items can be calculated by counting the number of paths following the paths to the "1_node".

As explained above, according to the first embodiment of the present invention, the number of validation items can be calculated efficiently by expressing the validation item functions in the BDD, without listing the validation items. Therefore, the designer can decide whether to decrease the validation items by referring to the calculated number of validation items. The validation efficiency can be improved by avoiding the validating of unnecessary validation items.

Further, according to the first embodiment of the present invention, when the validation support apparatus decides that the number of validation items is too large as a result of counting the calculated number, the number of the validation items can be decreased as follows. For example, the logical expression obtained from the condition 6 (a condition that limits a configuration element to be validated among the configuration elements 201 to 208 and 211 to 218 that constitute the functional block diagram 200) is added, and validation items are extracted again.

With this arrangement, the designer can exclude validation items that the designer considers as unnecessary. For example, when the designer decides that only the validation items requiring the use of the encoder 204 are necessary, "endMPEG≡1" as the logical expression (23) may be added to the constraint.

Figure 13:
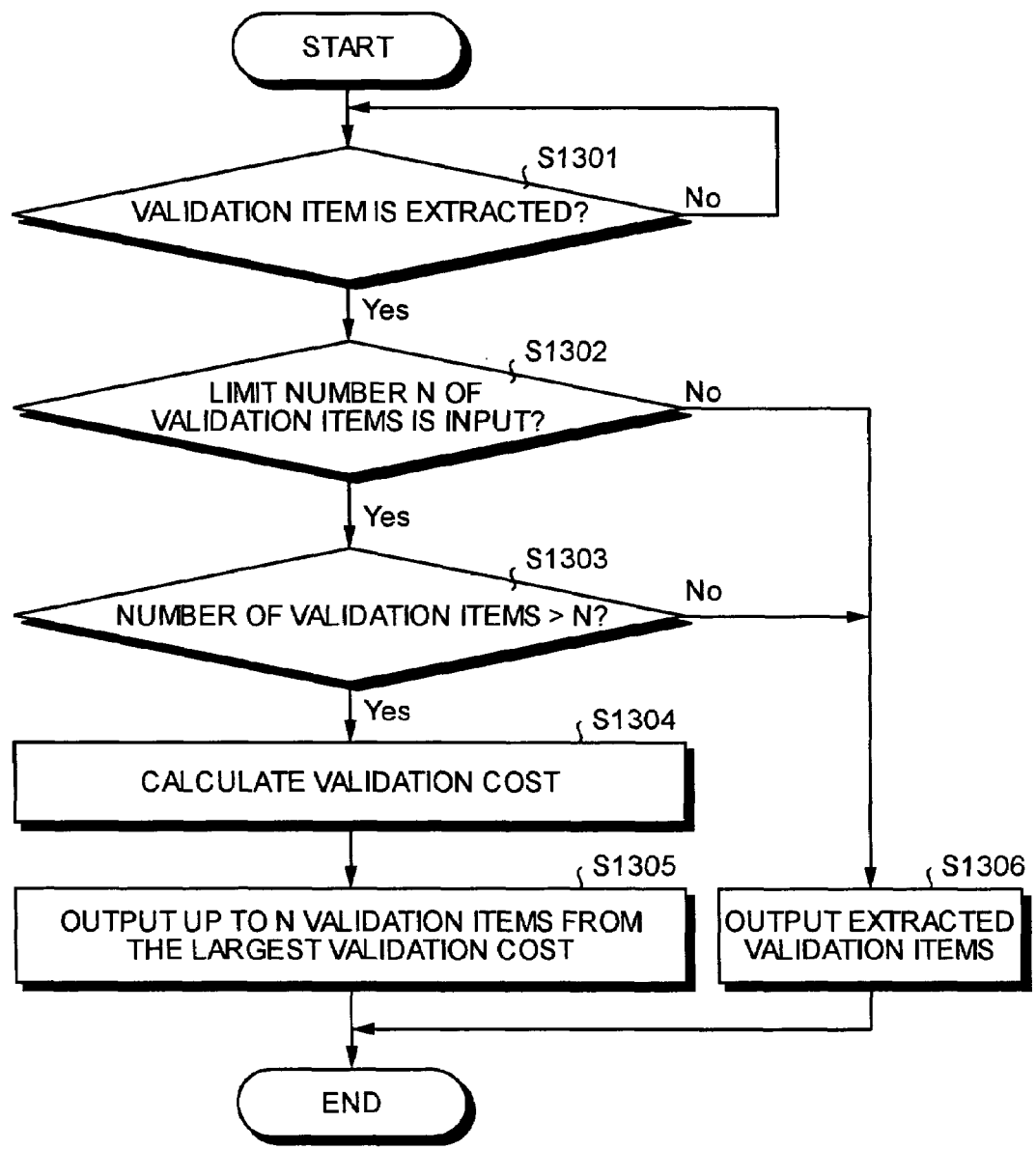
FIG. 13 is a flowchart of another example of a validation item extraction process of the validation support apparatus according to the first embodiment.

By placing a priority order to the validation items to be extracted, n validation items set in advance may be extracted thereby to decrease the number of validation items. The extraction process will be explained with reference to FIG. 13. First, the validation support apparatus decides whether the validation item extraction unit 609 extracted validation items (step S1301). When the validation support apparatus decides that the validation items are extracted (Yes at step S1301), the validation support apparatus decides whether the limit number of validation items is input in advance (step S1302).

When the limit number n of the validation items is input in advance (Yes at step S1302), the validation support apparatus decides whether the extracted number of validation items is larger than the limit number n (step S1303). When the extracted number of validation items is larger than the limit number n (Yes at step S1303), the validation support apparatus calculates the validation cost of each validation item by referring to the validation cost database 607 (step S1304).

The validation support apparatus outputs the validation items up to the n-th order starting from a validation item of the largest validation cost (step S1305). On the other hand, when the limit number n of validation items is not input in advance (No at step S1302), or when the extracted number of validation items is not more than the limit number n (No at step S1303), the validation support apparatus outputs straight the validation items extracted at step S1301 (step S1306).

According to the above method, important validation items to be validated can be extracted with priority, by adding validation costs to the n validation items determined in advance. Therefore, the designer can validate the validation items corresponding to the significance of the validation items, and can improve the validation precision of the apparatus to be validated.

Figure 14:
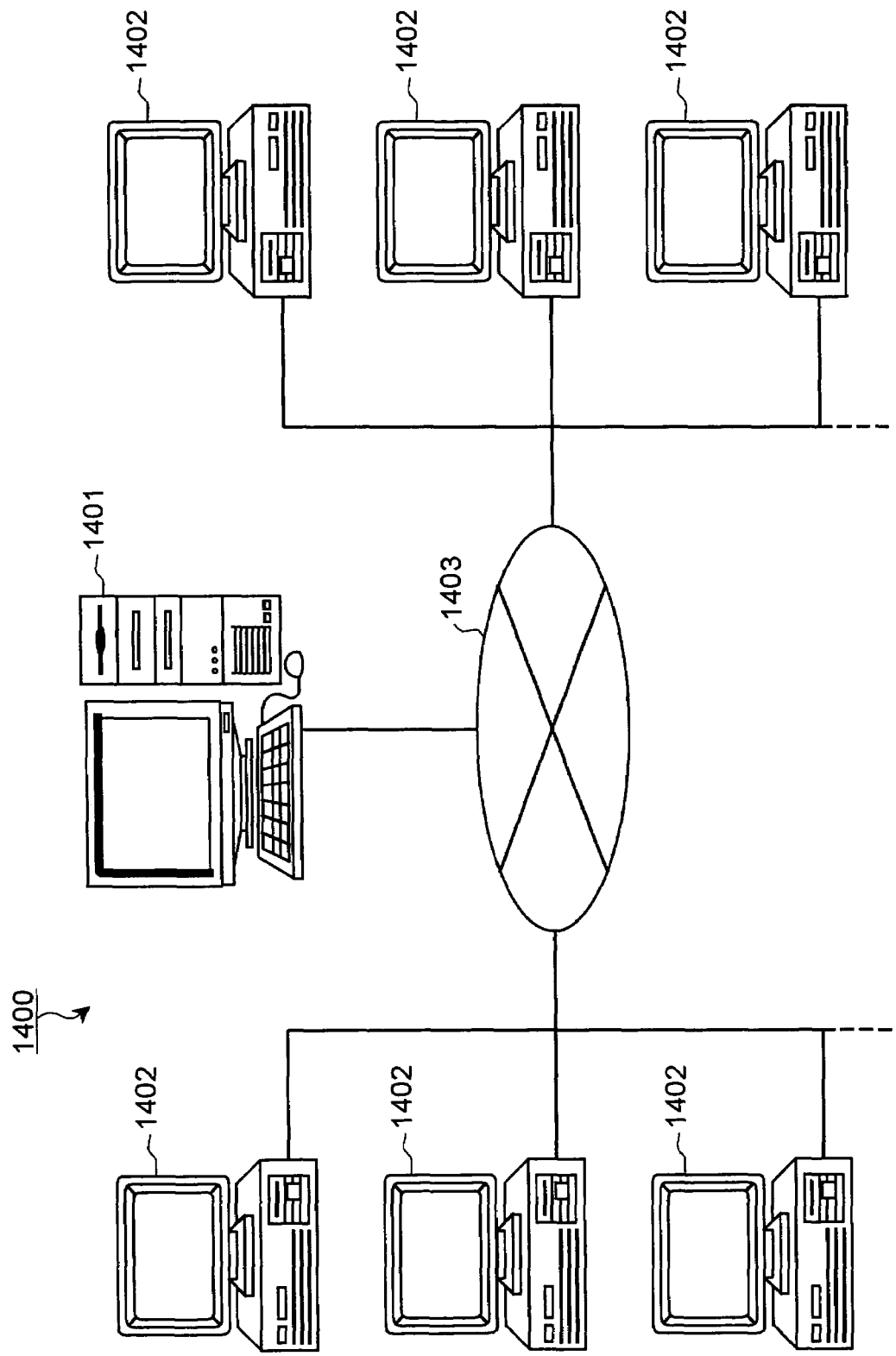
FIG. 14 is a schematic diagram of a validation support system according to the second embodiment.

While a single validation support apparatus supports the validation of an apparatus to be validated in the first embodiment, the validation is systematized by using a network to support the validation of the apparatus to be validated in a second embodiment of the present invention. FIG. 14 is a schematic diagram of a validation support system according to the second embodiment.

As shown in FIG. 14, a validation support system 1400 has a validation support apparatus 1401 that functions as a server, and information terminal apparatuses 1402. The validation support apparatus 1401 and the information terminal apparatuses 1402 are connected to each other via a network 1403 like a LAN or a wide area network (WAN). Hardware configurations of the validation support apparatus 1401 and the information terminal apparatuses 1402 are the same as those of the apparatuses shown in FIG. 1, and their explanation will be omitted.

Figure 15:
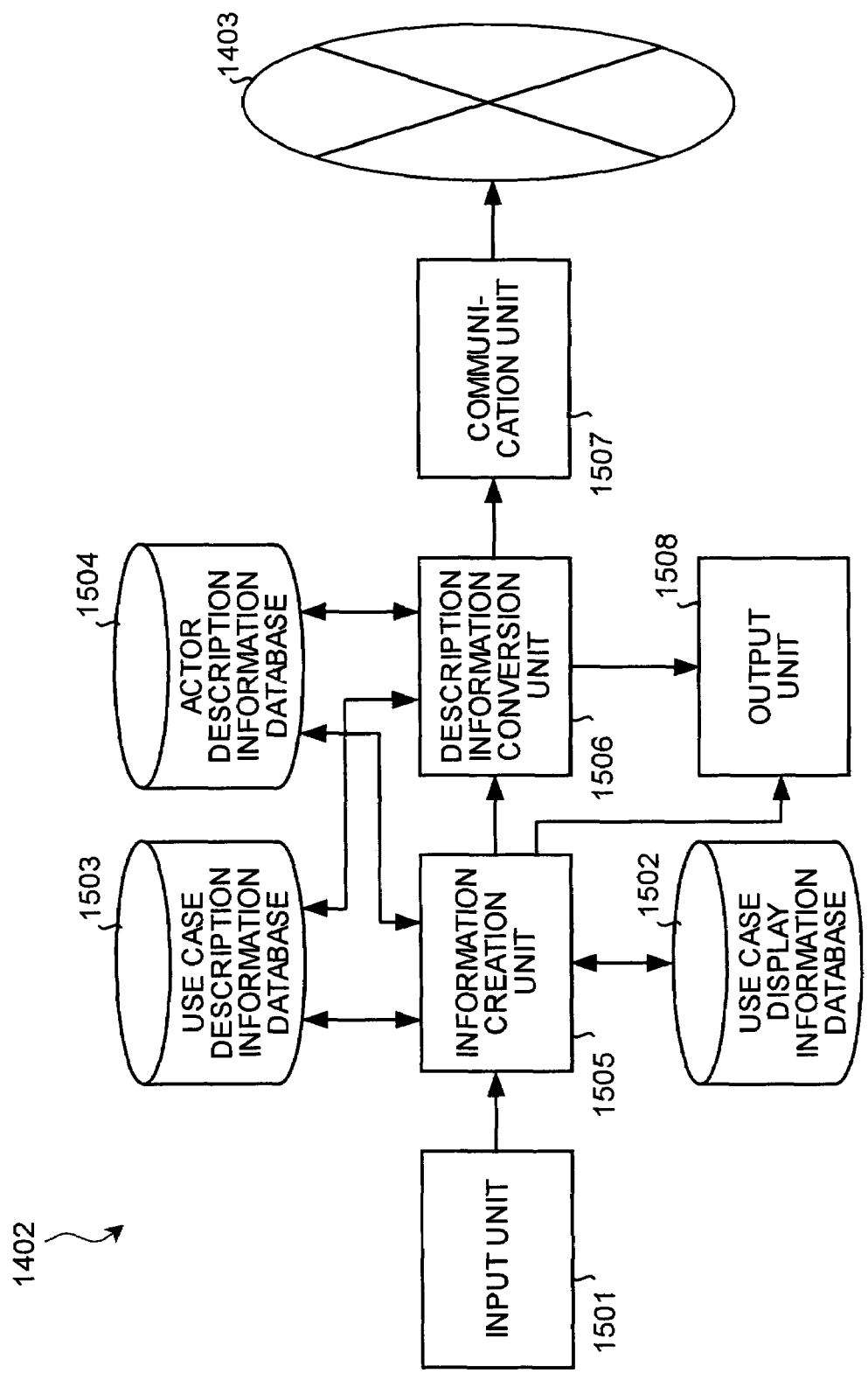
FIG. 15 is a block diagram of a functional configuration of an information terminal apparatus according to the second embodiment.

A functional configuration of the information terminal apparatus 1402 will be explained first. FIG. 15 is a block diagram of a functional configuration of an information terminal apparatus 1402 according to the second embodiment. In the second embodiment, the information terminal apparatus 1402 creates functional configuration information to extract validation items, and transmits this information to the validation support apparatus 1401 that functions as the server.

The information terminal apparatus 1402 can create the functional configuration information in a predetermined description language such as a UML. As one example of the functional configuration information, a use case diagram or a sequence diagram is available. A creation of the functional configuration information by using the use case diagram will be explained.

As shown in FIG. 15, the information terminal apparatus 1402 comprises an input unit 1501, a use case display information database 1502, a use case description information database 1503, an actor description information database 1504, an information creation unit 1505, a description information conversion unit 1506, a communication unit 1507, and an output unit 1508.

Figure 16:
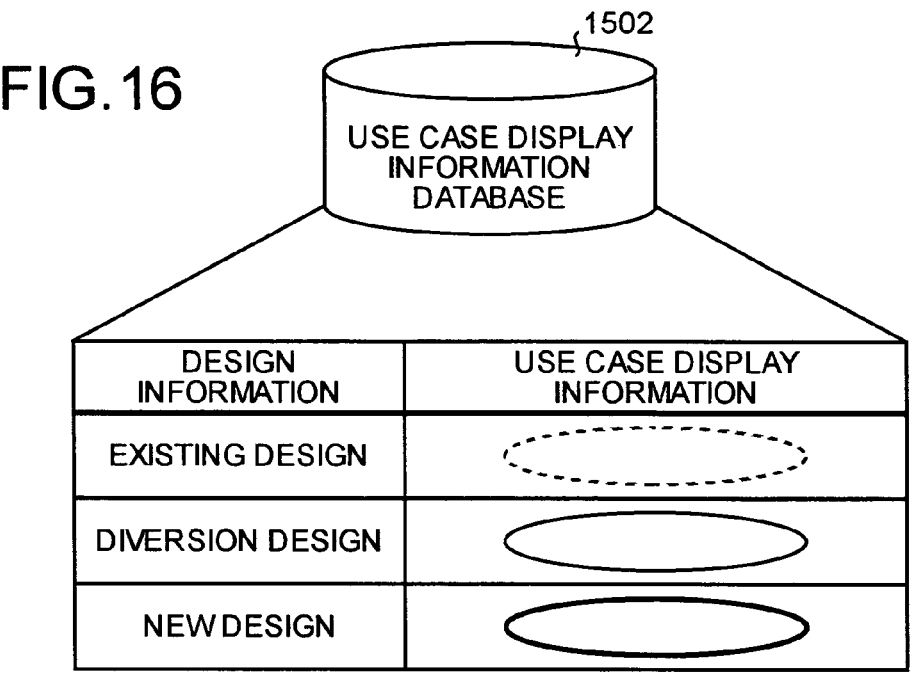
FIG. 16 is a configuration of data stored in a use case display information database of the information terminal apparatus according to the second embodiment.

An operation is input to the information creation unit 1505 from the input unit 1501. The keyboard 110 or the mouse 111 shown in FIG. 1 is used to achieve the function of the input unit 1501. The use case display information database 1502 stores a use case as display information of a functional device out of the use case diagram that illustrates the functional configuration of the apparatus to be validated. FIG. 16 is an explanatory diagram of a configuration of data stored in the use case display information database 1502. As shown in FIG. 16, the use case display information database 1502 stores design information of functional devices and use case information corresponding to each other.

Figure 17:
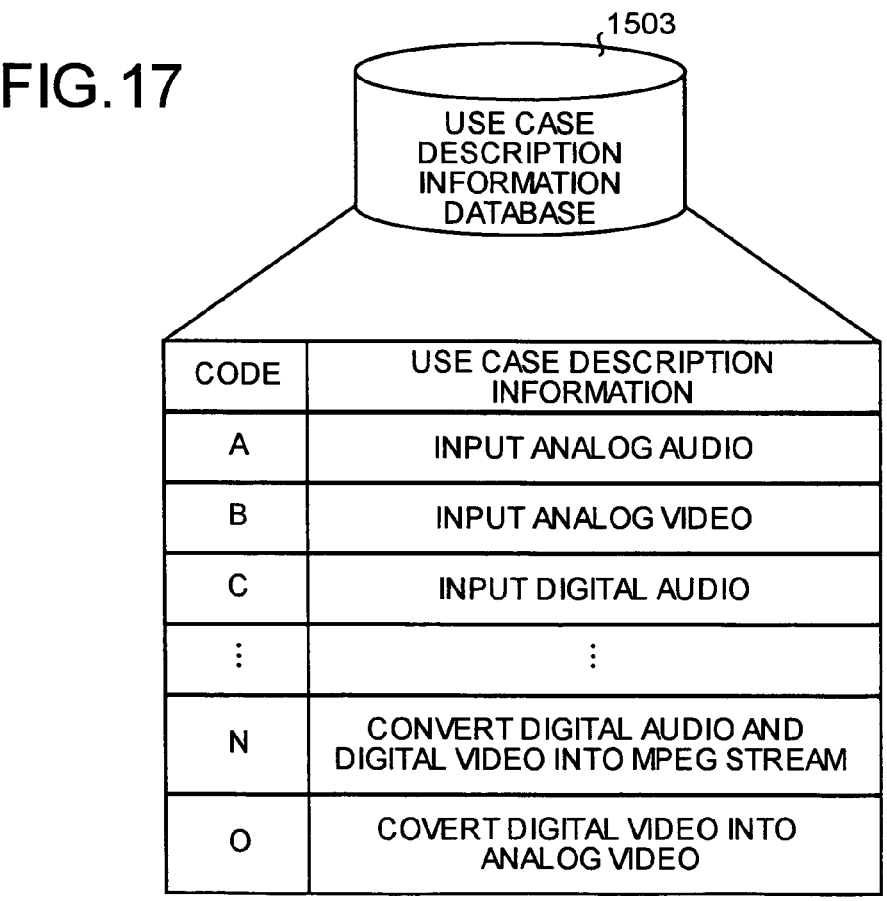
FIG. 17 is a configuration of data stored in a use case description information database of the information terminal apparatus according to the second embodiment.

The use case description information database 1503 stores use case description information to be inserted into the use case. FIG. 17 is a configuration of data stored in a use case description information database 1503 of the information terminal apparatus according to the second embodiment. As shown in FIG. 17, the use case description information database 1503 stores functions representing the operation of the functional devices by relating the functions to coded code information A to O.

Figure 18:
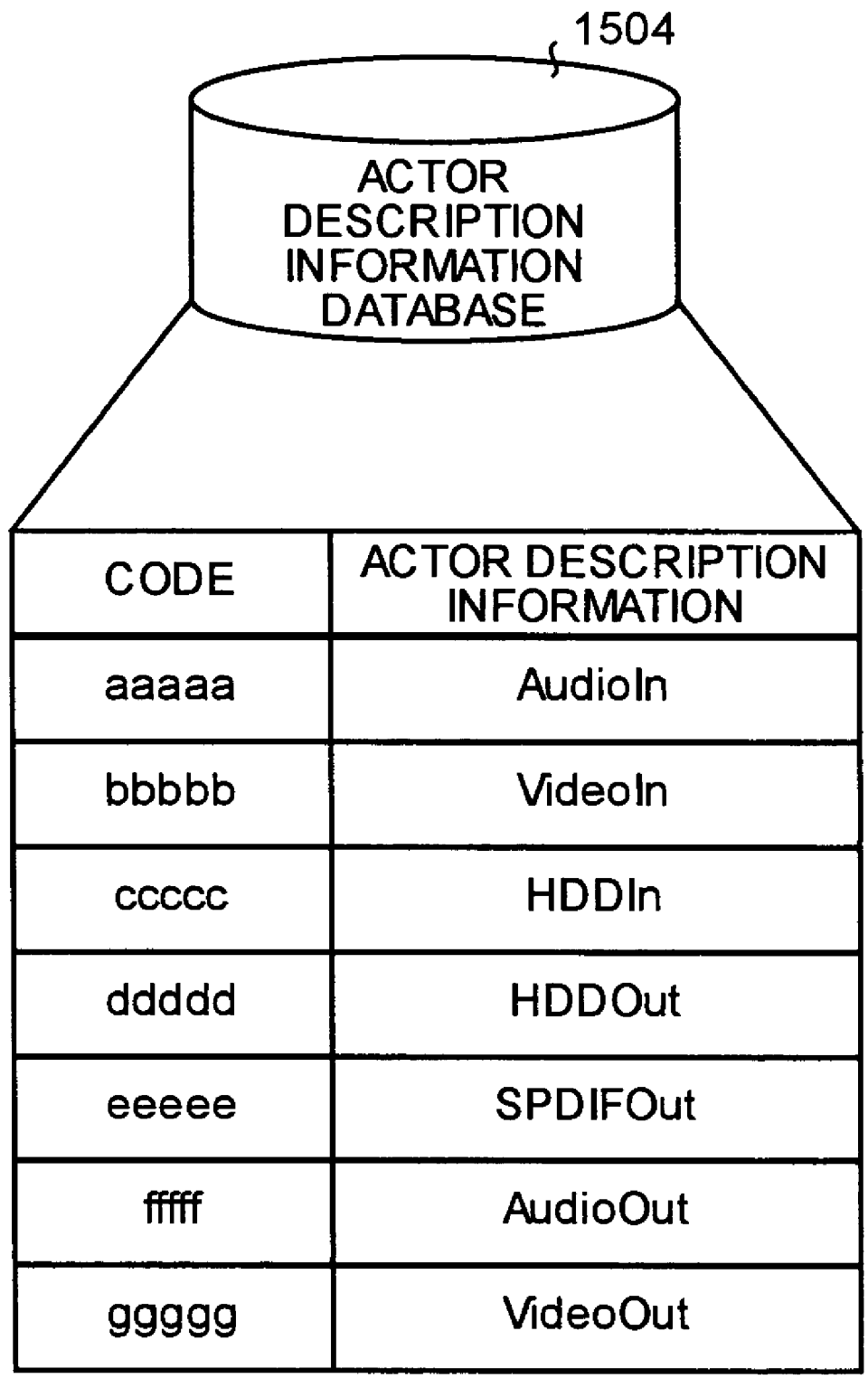
FIG. 18 is a configuration of data stored in an actor description information database of the information terminal apparatus according to the second embodiment.

The actor description information database 1504 stores names of actors displayed in the use case diagram. FIG. 18 is a configuration of data stored in an actor description information database 1504 of the information terminal apparatus according to the second embodiment. As shown in FIG. 18, the actor description information database 1504 stores names of the functional devices that become the actors, by relating these names to coded code information aaaaa to ggggg.

The use case display information database 1502, the use case description information database 1503, and the actor description information database 1504 achieve their functions using the ROM 102, the RAM 103, the HD 105, and the FD 107 shown in FIG. 1.

Figure 19:
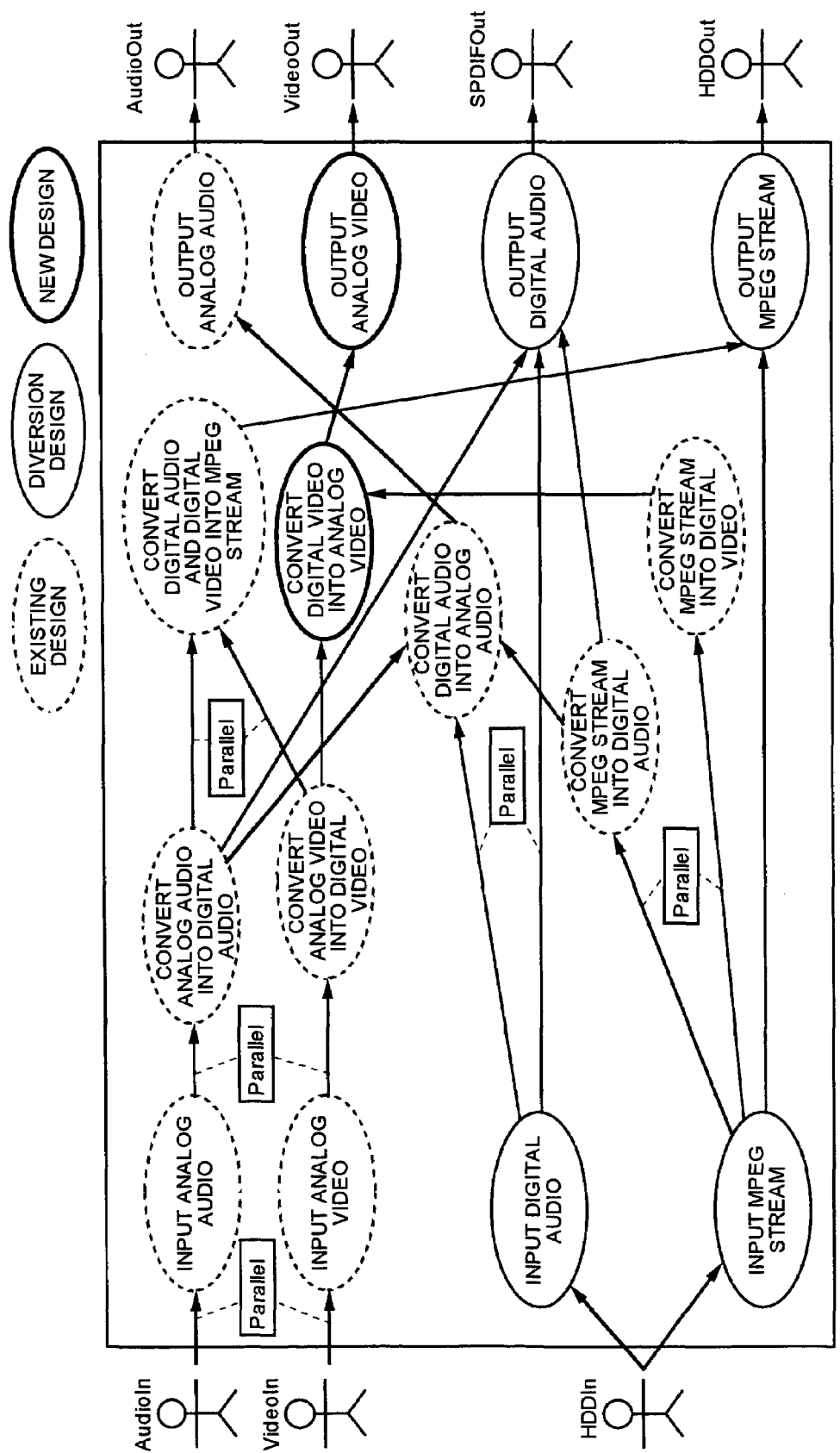
FIG. 19 is a use case diagram of an apparatus to be validated created by the information terminal apparatus according to the second embodiment.

As shown in FIG. 15, the information creation unit 1505 creates the use case diagram by using the use case stored in the functional device display information and the use case description information stored in the use case description information database 1503, according to the operation input from the input unit 1501. FIG. 19 is a use case diagram of an apparatus to be validated created by the information terminal apparatus according to the second embodiment.

The information creation unit 1505 creates a validation environment by using the use case description information stored in the use case description information database 1503, according to the operation input from the input unit 1501. The validation environment is a control command or the like that prescribes a data flow along a path extracted from the validation item. The validation environment includes a condition that prescribes an operation timing of a functional device corresponding to a node on a path, a condition that prescribes an order of functional devices corresponding to the nodes that passes through the path, and contents of data input to and output from the functional devices.

Figure 20:
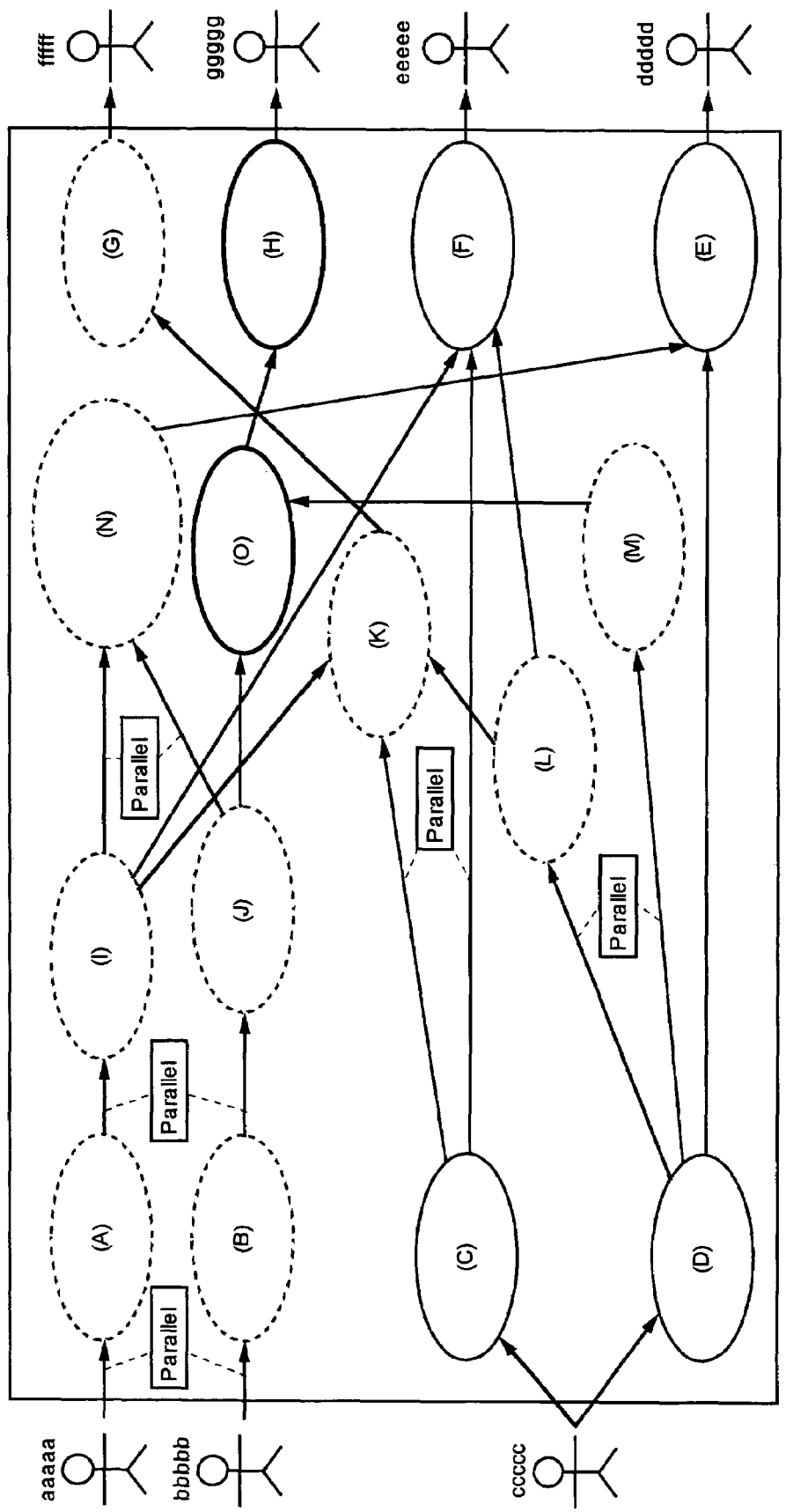
FIG. 20 is a use case diagram in which description information included in the use case diagram shown in FIG. 19 is converted into code information.

The description information conversion unit 1506 converts the use description information and the actor description information described in the use case diagram created by the information creation unit 1505, into the code information illustrated in FIG. 17 and FIG. 18. FIG. 20 is a use case diagram in which description information included in the use case diagram shown in FIG. 19 is converted into code information, which is contained in information transmitted from the validation support apparatus 1401 via the network 1403, to the use case description information illustrated in FIG. 17 and FIG. 18.

The CPU 101 executes programs stored in the ROM 102, the RAM 103, the HD 105, and the FD 107, or via the I/F 109 to achieve the functions of the information creation unit 1505 and the description information conversion unit 1506 respectively.

The communication unit 1507 transmits the use case diagram converted by the description information conversion unit 1506 and the validation environment to the validation support apparatus 1401 via the network 1403. The communication unit 1507 also receives the information transmitted from the validation support apparatus 1401 via the network 1403. The communication unit 1507 specifically achieves its function via the I/F 109 shown in FIG. 1.

The output unit 1508 outputs the use case diagram (see FIG. 19) created by the information creation unit 1505, the use case diagram (see FIG. 20) obtained by conversion by the description information conversion unit 1506, and the information transmitted from the validation support apparatus 1401 via the network 1403. The display 108 or the printer 113 shown in FIG. 1 achieves the function of the output unit 1508.

Figure 21:
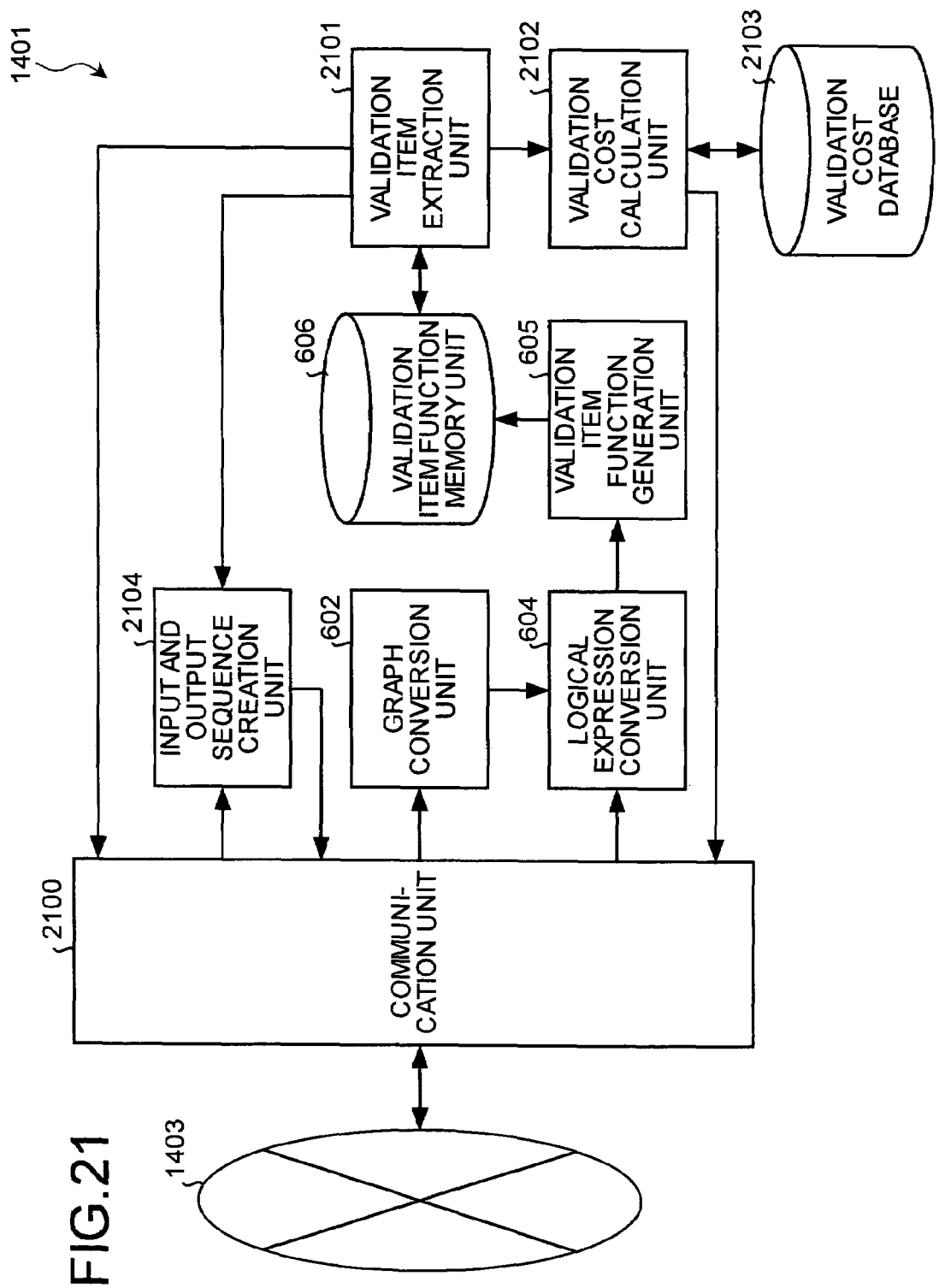
FIG. 21 is a block diagram of a functional configuration of the validation support apparatus according to the second embodiment.

A functional configuration of the validation support apparatus 1401 according to the second embodiment of the present invention will be explained next. FIG. 21 is a block diagram of a functional configuration of the validation support apparatus 1401 according to the second embodiment. The validation support apparatus 1401 functions as a server. As shown in FIG. 21, the validation support apparatus 1401 comprises a communication unit 2100, the graph conversion unit 602, the logical expression conversion unit 604, the validation item function generation unit 605, the validation item function memory unit 606, a validation item extraction unit 2101, a validation cost calculation unit 2102, a validation cost database 2103, and an input/output sequence creation unit 2104. The graph conversion unit 602, the logical expression conversion unit 604, the validation item function generation unit 605, and the validation item function memory unit 606 have similar configurations to those according to the first embodiment shown in FIG. 6, and their explanation will be omitted.

The validation item extraction unit 2101 extracts validation items from the validation items stored in the validation item function memory unit 606. The validation cost calculation unit 2102 calculates validation costs based on the validation items extracted from the validation item extraction unit 2101, and the costs from the validation cost database 2103.

Figure 22:
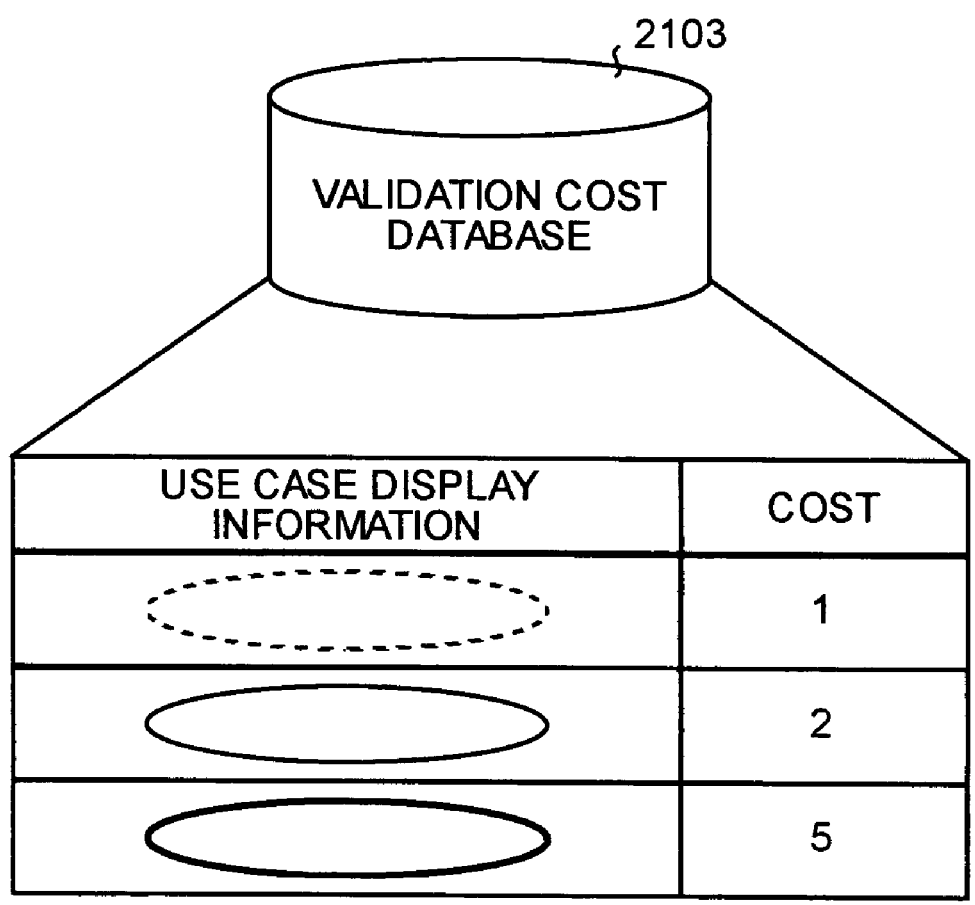
FIG. 22 is a configuration of data stored in a validation cost database of the validation support apparatus according to the second embodiment.

FIG. 22 is a configuration of data stored in a validation cost database 2103 of the validation support apparatus according to the second embodiment. The validation cost database 2103 stores use cases corresponding to costs. A cost "1" is applied to the use case of an existing design, a cost "2" is applied to the use case of a diversion design, and a cost "5" is applied to use case of a new design.

The input/output sequence creation unit 2104 creates an input/output sequence based on the validation environment transmitted from the information terminal apparatus 1402, and the validation items extracted by the validation item extraction unit 2101. The CPU 101 executes programs stored in the ROM 102, the RAM 103, the HD 105, and the FD 107, or via the I/F 109 shown in FIG. 1 to achieve the functions of the validation item extraction unit 2101, the validation cost calculation unit 2102, and the input/output sequence creation unit 2104. The ROM 102, the RAM 103, the HD 105, and the FD 107 shown in FIG. 1 achieve the function of the validation cost database 2103.

Figure 23:
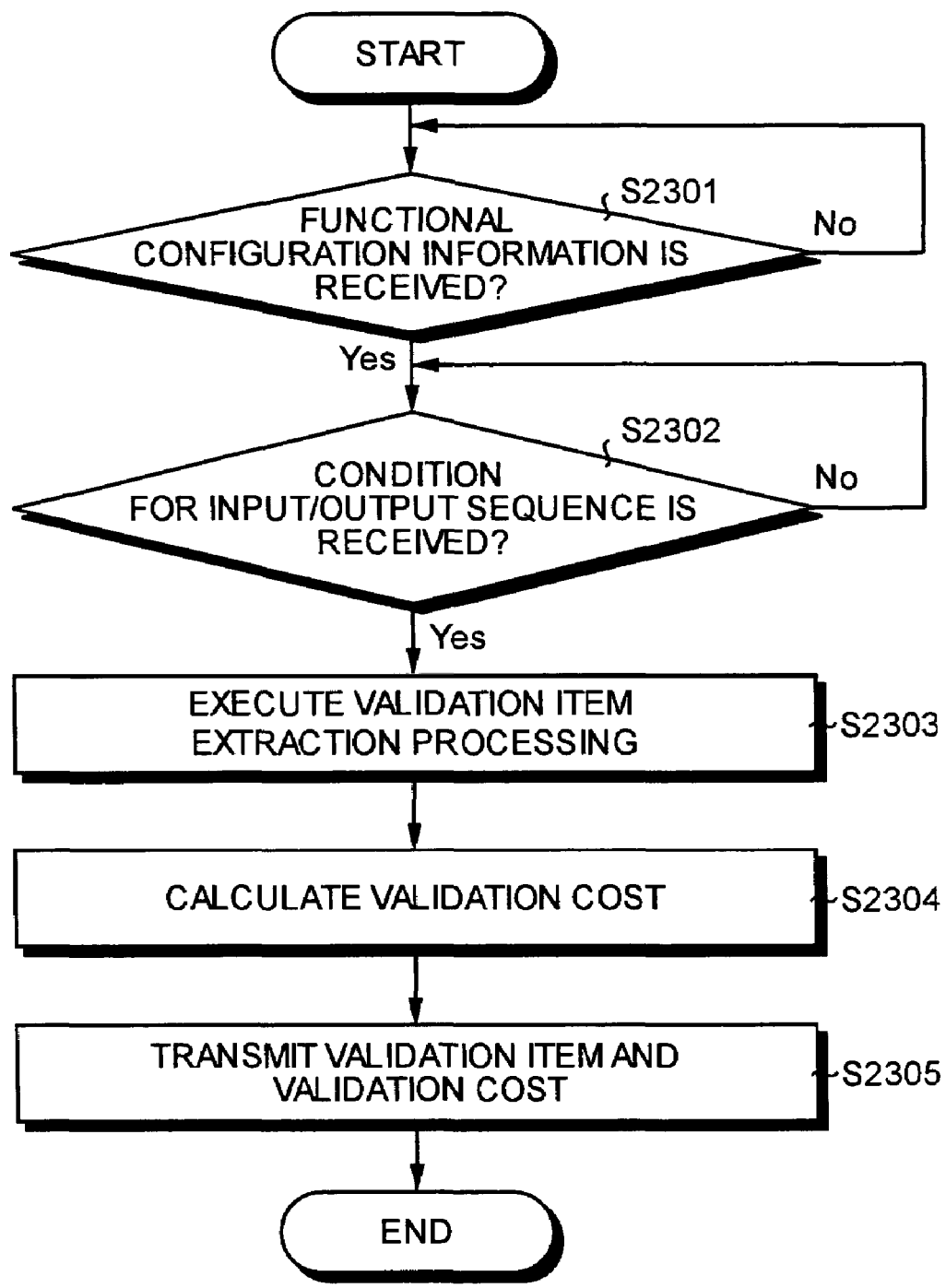
FIG. 23 is a flowchart of an example of an extraction process of the validation support apparatus according to the second embodiment.

The extraction process of the validation support apparatus according to the second embodiment will be explained. FIG. 23 is a flowchart of an example of an extraction process of the validation support apparatus according to the second embodiment. When the validation support apparatus receives the use case diagram (see FIG. 20) having coded actor description information and coded use case description information from the information terminal apparatus 1402 (Yes at step S2301), the validation support apparatus decides whether a condition concerning the input/output sequence is received (step S2302). When the condition concerning the input/output sequence is received (Yes step S2302), the validation support apparatus executes the validation item extraction processing based on the received use case and the input/output sequence (step S2303).

This validation item extraction processing is similar to that at step S901 to step S906 (see FIG. 9) according to the first embodiment, and the explanation of this processing will be omitted. The validation support apparatus calculates validation costs from the detected validation items (step S2304), and transmits the validation items and the validation costs to the information terminal apparatus 1402 (step S2305). FIG. 24 is a table of validation items and validation costs extracted by the validation support apparatus according to the second embodiment.

FIG. 24 illustrates five kinds of validation items from No. 1 to No. 5. For example, at the validation item No. 1, data input from the input unit aaaaa is input to a functional device N via a functional device A and a functional device I. Data input from the input unit bbbbb is input to the functional device N via a functional device B and a functional device C. Data from the functional device I and the functional device J are output from the output unit ddddd via the functional device N and a functional device E.

A cost of the use case of the functional device A is "1", a cost of the use case of the functional device B is "1", a cost of the use case of the functional device I is "1", a cost of the use case of the functional device J is "1", a cost of the use case of the functional device N is "1", and a cost of the use case of the functional device E is "2". Therefore, the validation cost of the validation item No. 1 is "7" as a sum of these costs.

Similarly, the validation support apparatus calculates validation costs of the validation item No. 2 to No. 5. As shown in FIG. 24, the validation cost of the validation item No. 2 is "18", the validation cost of the validation item No. 3 is "6", the validation cost of the validation item No. 4 is "18", and the validation cost of the validation item No. 5 is "4".

The information terminal apparatus 1402 receives the validation items and the validation costs, and decodes the validation items and the validation costs by referring to the use case description information database 1503, and the actor description information database 1504. FIG. 25 is a table of validation items and validation costs that are converted into original description information from code information included in the validation items and the validation cost shown in FIG. 24. It is clear from FIG. 25 that the validation costs of the validation item No. 2 and No. 4 are the largest. Consequently, a person to perform validations can validate the validation items starting from an item having the largest validation cost with priority.

As the validation item also displays the use case, the person to perform validations can judge whether the functional device that constitutes the validation item corresponds to an existing design, a diversion design, or a new design. Therefore, as well as a detection cost, the type of design can be a criterion in the selection as to which item is to be given priority for the validation.

For example, as the validation cost of the validation item No. 1 is "7" and the validation cost of the validation item No. 3 is "6", the validation item No. 1 is validated with priority over the validation item No. 3. However, the validation item No. 1 has one use case of the diversion design, and the validation item No. 3 has two use cases of the diversion design. Therefore, the designer can validate the validation item No. 3 with priority over the validation item No. 1.

The creation process of the input/output sequence will be explained next. FIG. 26 is a flowchart illustrating the input/output sequence creation process. First, the validation support apparatus decides whether a validation item is extracted (step S2601). When the validation support apparatus decides that a validation item is extracted (Yes at step S2601), the validation support apparatus decides whether the validation environment is received (step S2602). When the validation environment is received (Yes at step S2602), the validation support apparatus creates the input/output sequence (step S2603), and transmits the created input/output sequence to the information terminal apparatuses 1402 (step S2604).

Figures 27, 28, 29:
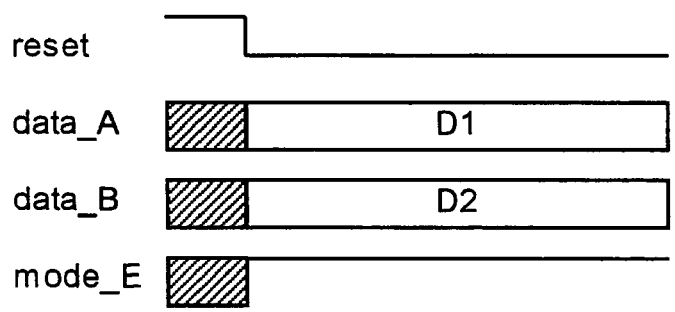
FIG. 27 is an example of a validation environment created by the information terminal apparatus according to the second embodiment.
FIG. 28 is the input/output sequence created by the validation support apparatus according to the second embodiment.
FIG. 29 is a time chart of the input/output sequence shown in FIG. 28.

According to FIG. 27, the validation environment is that reset=1 at time 0, that reset=0 at time 1 or afterward, that data_A=D1 for code information (A), that data_B=D2 for code information (B), and that mode_E=1 for code information (E).

The validation support apparatus creates the input/output sequence based on the validation items detected by the validation item extraction unit 609. For example, the validation support apparatus creates the input/output sequence as shown in FIG. 28 for the validation item No. 1 shown in FIG. 24. Specifically from the validation item No. 1, the validation support apparatus extracts a path in which the functional device A inputs analog audio, the functional device B inputs analog video, and the functional device E outputs an MPEG stream.

When the validation environment is given, a time chart (i.e., input/output sequence) as shown in FIG. 29 can be created. According to this time chart, at time 1 and afterward, the functional device A inputs the analog audio D1, the functional device B inputs the analog video D2, and the functional device E outputs the MPEG stream.

With the above arrangement, the input/output sequence can be provided to the designer The validation support apparatus can give the provided input/output sequence directly to the apparatus to be validated without requiring the designer to create the input/output sequence. Accordingly, the validation efficiency can be improved.

As explained above, according to the second embodiment of the present invention, in the information terminal apparatus 1402, the input unit, the output unit, and the functional devices that constitute the created use case diagram are coded. Therefore, the use case can be made secret. Similarly, the input unit, the output unit, and the functional devices that are coded extract the validation items. Therefore, the validation items can be made secret.

Consequently, the designer as the provider of the use case diagram can provide the use case diagram to the validation support apparatus while making the contents of the use case diagram confidential. The validation support apparatus can extract the validation items even if the description information contained in the use case diagram is coded. As a result, the validation support apparatus can provide a high-safety validation support.

In the second embodiment, the information terminal apparatus 1402 converts the use case description information and the actor description information into code information, thereby to make secret the use case description information and the actor description information. Alternatively, the character strings of the use case description information and the actor description information can also be encrypted according to a known encryption technique. With this arrangement, the validation support apparatus can similarly provide a high-safety validation support.

According to the first and second embodiments, the validation support apparatus 1401 can extract validation items that are necessary for an executable input/output sequence. Therefore, the validation support apparatus 1401 can validate the apparatus to be validated easily and efficiently. Consequently, the designing period can be shortened.

Further, a computer such as a personal computer or a workstation can execute a program created in advance to achieve the validation support method according to the first and second embodiments. This program is recorded on a computer-readable recording medium such as a hard disk, a flexible disk, a CD-ROM, an MO, or a DVD. The computer reads the program from the recording medium to execute the program. This program may be a transmission medium that can be distributed via a network such as the Internet.

The validation support apparatuses explained in the first and second embodiments are suitable to support the validation of an electronic apparatus using an LSI such as a DVD/HDD video recorder, a portable telephone, and a navigation system.

As explained above, according to the present invention, validation items that are necessary for an executable input/ output sequence can be extracted. Therefore, the validation support apparatus can validate the apparatus to be validated easily and efficiently. Consequently, there is an effect that the designing period can be shortened.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus that supports a validation of a target apparatus including a plurality of functional devices by generating an input/output sequence for the target apparatus, comprising:
    a first input unit for inputting functional configuration information on the functional devices and connections among the functional devices;
    a second input unit for inputting a condition for the input/output sequence;
    a first generating unit that generates a validation item function based on the functional configuration information and the condition;
    an extracting unit that extracts a combination of functional devices as a validation item, from the validation item function; and
    a second generating unit that generates the input/output sequence based on a combination of the validation item and a cost associated with the validation item.

2. The apparatus according to claim 1, wherein the validation item function is expressed by a binary decision diagram.

3. The apparatus according to claim 1, wherein the condition includes a resource constraint condition for the functional devices.

4. The apparatus according to claim 1, wherein the condition includes a condition that limits the functional devices to be included in the validation item.

5. The apparatus according to claim 1,
    wherein the extracting unit extracts n or less validation items, where n or less validation items extracted is a positive integer larger than one, and
    wherein the second generating unit generates a plurality of input/output sequences based on the validation items.

6. The apparatus according to claim 1, further comprising:
    a converting unit that converts a functional block diagram of the target apparatus into a graph including a plurality of nodes and a plurality of edges, wherein
    the graph is input to the apparatus as the functional configuration information.

7. The apparatus according to claim 1, further comprising:
    a third input unit for inputting a validation environment that defines a flow of data that is input to and output from the target apparatus,
    wherein the second generating unit that generates the input/output sequence, based on the validation environment and the validation item.

8. The apparatus according to claim 1, wherein
    the apparatus is connected, via a network, to an information terminal from which the functional configuration information and the condition are input and to which the validation item and the input/output sequence are output.

9. The apparatus according to claim 7, wherein
    the apparatus is connected, via a network, to an information terminal from which the functional configuration information, the condition, and the validation environment are input and to which the validation item and the input/output sequence are output.

10. A computer-readable storage that stores therein a computer program for supporting a validation of a target apparatus including a plurality of functional devices by generating an input/output sequence for the target apparatus wherein the computer program causes a computer to execute:
    receiving an input of functional configuration information on the functional devices and connections among the functional devices;
    receiving an input of a condition for the input/output sequence;
    generating a validation item function, based on the functional configuration information and the condition;
    extracting a combination of functional devices as a validation item, from the validation item function; and
    generating the input/output sequence based on a combination of the validation item and a cost associated with the validation item.

11. A method for supporting a validation of a target apparatus including a plurality of functional devices by generating an input/output sequence for the target apparatus, comprising:
    generating a validation item function based on input of functional configuration of the target apparatus and input of a condition of the input/output sequence; and
    generating the input/output sequence based on a combination of functional devices extracted from the validation item function and validation costs associated with the functional devices extracted.

* * * * *

UNITED STATES PATENT AND TRADEMARK OFFICE
CERTIFICATE OF CORRECTION

| | | |
|---|---|---|
| PATENT NO. | : 7,536,620 B2 | Page 1 of 1 |
| APPLICATION NO. | : 10/680105 | |
| DATED | : May 19, 2009 | |
| INVENTOR(S) | : Kenji Abe et al. | |

It is certified that error appears in the above-identified patent and that said Letters Patent is hereby corrected as shown below:

Title Page, Column 2 (Other Publications), Line 1, change "Avthoritative" to --Authoritative--.

Column 17, Lines 30-31, change
"2. The apparatus according to claim 1, wherein the validation item function is expressed by a binary decision diagram." to
--2. The apparatus according to claim 1, wherein
    the validation item function is expressed by a binary
      decision diagram.--.

Signed and Sealed this

Thirteenth Day of October, 2009

David J. Kappos
*Director of the United States Patent and Trademark Office*